US010015693B2

(12) United States Patent
Zhang et al.

(10) Patent No.: US 10,015,693 B2
(45) Date of Patent: Jul. 3, 2018

(54) METHOD FOR USING RADIO INTERFACE TECHNOLOGY, APPARATUS, AND COMMUNICATIONS SYSTEM

(71) Applicant: Huawei Technologies Co., Ltd., Shenzhen (CN)

(72) Inventors: Jian Zhang, Shanghai (CN); Lixia Xue, Beijing (CN); Qinghai Zeng, Shanghai (CN); Yuanjie Li, Shanghai (CN); Ting Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/695,525

(22) Filed: Sep. 5, 2017

(65) Prior Publication Data

US 2017/0367003 A1 Dec. 21, 2017

Related U.S. Application Data

(63) Continuation of application No. PCT/CN2015/073820, filed on Mar. 6, 2015.

(51) Int. Cl.
*H04W 36/00* (2009.01)
*H04W 28/02* (2009.01)
(Continued)

(52) U.S. Cl.
CPC ......... *H04W 28/0226* (2013.01); *H04W 8/08* (2013.01); *H04W 16/02* (2013.01);
(Continued)

(58) Field of Classification Search
None
See application file for complete search history.

(56) References Cited

U.S. PATENT DOCUMENTS

| 9,144,091 B2 * | 9/2015 | Yamada ................ H04W 76/00 |
| 2007/0064641 A1 | 3/2007 | Laroia et al. |

(Continued)

FOREIGN PATENT DOCUMENTS

| CN | 1705400 A | 12/2005 |
| CN | 102833724 A | 12/2012 |

(Continued)

OTHER PUBLICATIONS

Alkhansa et al., "LTE-WIFI Carrier Aggregation for Future 5G Systems: A Feasibility Study and Research Challenges," The 9th International Conference on Future Networks and Communications, vol. 34, Procedia Computer Science, Elsevier, (2014).

*Primary Examiner* — Erika Washington
(74) *Attorney, Agent, or Firm* — Leydig, Voit & Mayer, Ltd.

(57) ABSTRACT

Embodiments of the present disclosure provide: dividing, by a base station, a frequency band of a cell into N frequency ranges, where the N frequency ranges include a common frequency range and a dedicated frequency range; sending, by the base station, information about the N frequency ranges and random access resource information of the cell to a UE; mapping, by the base station, a service bearer DRB of the UE into at least one frequency range of the N frequency ranges; and transmitting, by using a radio interface technology supported by the specified frequency range into which the DRB is mapped, a service carried on the DRB with the UE. A method for using a radio interface technology includes: using, by UE, a common frequency range, and optionally, using, by the UE, a dedicated frequency range to perform wireless network access.

25 Claims, 15 Drawing Sheets

(51) Int. Cl.
*H04W 72/04* (2009.01)
*H04W 74/08* (2009.01)
*H04W 8/08* (2009.01)
*H04W 92/14* (2009.01)
*H04W 16/02* (2009.01)
*H04W 40/22* (2009.01)
*H04W 88/10* (2009.01)
*H04W 84/04* (2009.01)
*H04W 24/02* (2009.01)

(52) U.S. Cl.
CPC ........... *H04W 24/02* (2013.01); *H04W 40/22* (2013.01); *H04W 72/0453* (2013.01); *H04W 74/0833* (2013.01); *H04W 84/045* (2013.01); *H04W 88/10* (2013.01); *H04W 92/14* (2013.01)

(56) References Cited

U.S. PATENT DOCUMENTS

| | | |
|---|---|---|
| 2013/0210447 A1 | 8/2013 | Moe et al. |
| 2014/0044025 A1 | 2/2014 | Li et al. |
| 2014/0198734 A1 | 7/2014 | Yamada et al. |
| 2014/0335883 A1 | 11/2014 | Ericson et al. |

FOREIGN PATENT DOCUMENTS

| | | |
|---|---|---|
| CN | 103582075 A | 2/2014 |
| EP | 2324654 A1 | 5/2011 |
| WO | 2010025279 A1 | 3/2010 |

\* cited by examiner

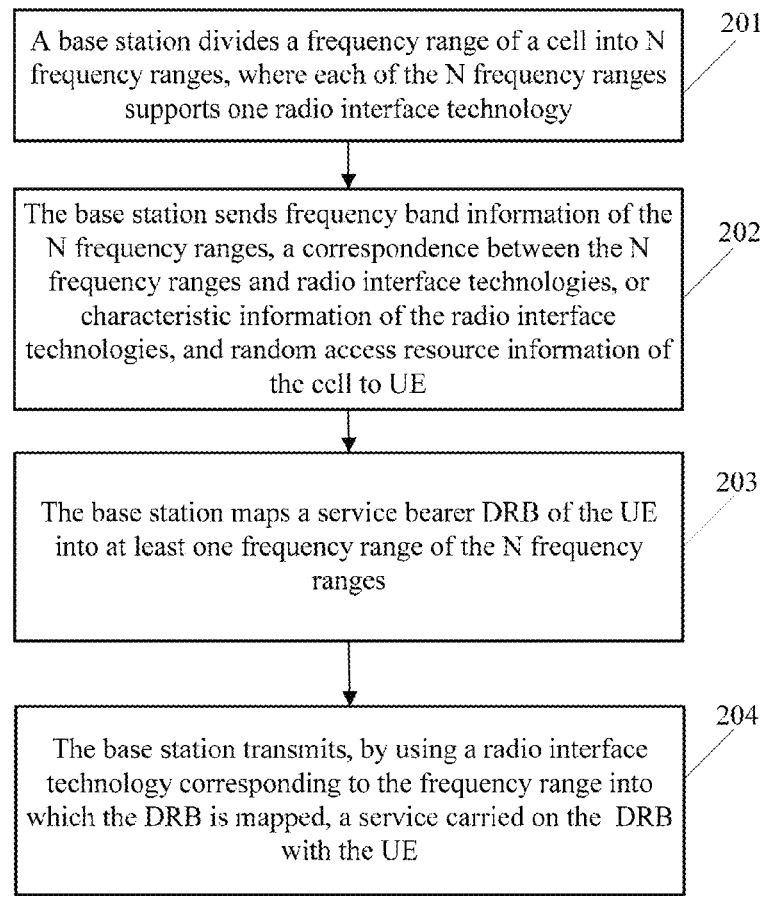

| Dedicated frequency range 1 | Common frequency range | Dedicated frequency range 2 | Dedicated frequency range 3 |

METHOD FOR USING RADIO INTERFACE TECHNOLOGY, APPARATUS, AND COMMUNICATIONS SYSTEM

CROSS-REFERENCE TO RELATED APPLICATIONS

This application is a continuation of International Application No. PCT/CN2015/073820, filed on Mar. 6, 2015, the disclosure of which is hereby incorporated by reference in its entirety.

TECHNICAL FIELD

The present disclosure relates to the field of communications technologies, and specifically, to a method for using a radio interface technology, an apparatus, and a system. The present disclosure is especially applicable to access to a wireless network system by using a flexible radio interface technology.

BACKGROUND

A radio interface technology or a radio interface protocol generally includes a multiple access mode, a modulation and coding scheme (MCS), a frame structure, a physical channel, a transport channel, a logical channel, MAC, Radio Link Control (RLC), the Packet Data Convergence Protocol (PDCP), Radio Resource Control (RRC), and the like. In an existing wireless communications system, only one radio interface technology is supported on one carrier. For example, only one type of multiple access mode or only one type of frame structure is supported. Such a manner for utilizing a radio resource is not flexible. It is difficult to dynamically adjust a requirement for a radio resource, resulting in low radio resource utilization.

SUMMARY

Embodiments of the present disclosure provide a method for using a radio interface technology, an apparatus, and a communications system, so as to improve flexibility of radio resource configuration, thereby improving radio resource utilization.

A first aspect of the embodiments of the present disclosure provides a method for using a radio interface technology, including:

dividing, by a base station, a frequency band of a cell into N frequency ranges, where each of the N frequency ranges supports one radio interface technology, and the cell supports at least two radio interface technologies;

sending, by the base station, radio resource configuration information of the N frequency ranges and random access resource information of the cell to UE, where the random access resource information is used to instruct the UE to access the cell or instruct the UE to perform uplink synchronization with the cell;

mapping, by the base station, a service radio bearer DRB of the UE into at least one frequency range of the N frequency ranges, where each of the DRB is corresponding to one of the at least one frequency range, and each of the at least one frequency range is corresponding to at least one of the DRB;

sending, by the base station, indication information to the UE, where the indication information is used to indicate a frequency range into which the DRB needs to be mapped; and transmitting, by the base station by using a radio interface technology supported by the frequency range into which the DRB is mapped, a service carried on the DRB with the UE; where N is an integer, and $N \geq 2$.

With reference to the first aspect, in a first possible implementation, the frequency range includes a common frequency range and a dedicated frequency range, where the common frequency range is a frequency range shared by radio interface technologies supported by the N frequency ranges, and includes a radio resource required by a common channel, or a radio resource required by a common channel and a signaling radio bearer SRB; and the dedicated frequency range is a frequency range used by the radio interface technology individually, and the dedicated frequency range carries a radio resource required by a DRB.

Optionally, the radio resource configuration information is at least one of frequency band information, a correspondence between the N frequency ranges and the radio interface technologies, or characteristic information of the radio interface technology.

With reference to the first possible implementation of the first aspect, in a second possible implementation, the common frequency range further includes a radio resource required by a DRB; and the dedicated frequency range further includes a radio resource required by an SRB.

With reference to the first aspect, in a third possible implementation, the frequency range includes a dedicated frequency range, where the dedicated frequency range is a frequency range used by the radio interface technology individually, and includes a common channel, a radio resource required by an SRB, and a radio resource required by a DRB.

With reference to any one of the first to the third possible implementations of the first aspect, in a fourth possible implementation, the common channel includes a synchronization channel, a cell-specific reference signal, a broadcast channel, a paging channel, or a random access channel.

With reference to the first aspect, in a fifth possible implementation, before the mapping, by the base station, a service radio bearer DRB of the UE into at least one frequency range of the N frequency ranges, the method further includes:

mapping, by the base station, an SRB of the UE into at least one frequency range of the N frequency ranges, where each of the SRB is corresponding to one of the at least one frequency range, and each of the at least one frequency range is corresponding to at least one of the SRB;

sending, by the base station, Radio Resource Control RRC signaling to the UE by using a radio interface technology supported by the frequency range into which the SRB is mapped, where the RRC signaling is used to establish the DRB of the UE; and sending, by the base station, first indication information to the UE, where the first indication information is used to indicate, to the UE, a frequency range into which the SRB needs to be mapped.

With reference to the first aspect, in a sixth possible implementation, the method further includes: sending, by the base station, frequency band information of the N frequency ranges to the user equipment UE by using a system broadcast message or RRC control signaling.

With reference to the sixth possible implementation of the first aspect, in a seventh possible implementation, the sending, by the base station, frequency band information of the N frequency ranges to the UE includes:

sending, by the base station, the frequency band information of the N frequency ranges to the UE by using the system broadcast message or the RRC control signaling.

With reference to the seventh possible implementation of the first aspect, in an eighth possible implementation, the method further includes:

sending, by the base station, the system broadcast message or the RRC control signaling to the UE by using a common frequency range, where the system broadcast message or the RRC control signaling includes frequency band information of the common frequency range and frequency band information of a dedicated frequency range; or sending, by the base station, the system broadcast message or the RRC control signaling to the UE by using a dedicated frequency range, where the system broadcast message or the RRC control signaling includes frequency band information of the dedicated frequency range.

With reference to the first aspect, in a ninth possible implementation, the characteristic information of the radio interface technology includes a multiple access mode of the radio interface technology, a frame structure of the radio interface technology, a physical channel characteristic of the radio interface technology, an uplink-downlink subframe configuration of the radio interface technology, or a physical channel resource configuration of the radio interface technology.

A second aspect of the embodiments of the present disclosure provides a method for using a radio interface technology, where a base station divides a frequency band of a cell into N frequency ranges, each of the N frequency ranges supports one radio interface technology, and the cell supports at least two radio interface technologies; and the method includes:

receiving, by user equipment UE, radio resource configuration information of the N frequency ranges and random access resource information of the cell that are sent by the base station, where the random access resource information is used to instruct the UE to access the cell or instruct the UE to perform uplink synchronization with the cell;

accessing, by the UE, a wireless network or performing uplink synchronization according to the random access resource of the cell sent by the base station;

receiving, by the UE, indication information sent by the base station, where the indication information is used to indicate a frequency range into which a data radio bearer DRB of the UE needs to be mapped;

mapping, by the UE, the DRB of the UE into the frequency range into which the DRB needs to be mapped; and transmitting, by the UE by using a radio interface technology supported by the frequency range into which the DRB is mapped, a service carried on the DRB with the base station; where N is an integer, and N≥2.

Optionally, the radio resource configuration information is at least one of frequency band information, a correspondence between the N frequency ranges and radio interface technologies, or characteristic information of the radio interface technology.

With reference to the second aspect, in a first possible implementation, the N frequency ranges include a common frequency range and a dedicated frequency range, or include a dedicated frequency range;

the UE receives, from a system broadcast message or Radio Resource Control RRC signaling that is sent by the base station, the frequency band information of the N frequency ranges that is sent by the base station.

With reference to the first possible implementation of the second aspect, in a second possible implementation, the method further includes:

receiving, by the UE, the system broadcast message or the RRC control signaling that is sent by the base station by using the common frequency range, where the system broadcast message or the RRC control signaling includes frequency band information of the common frequency range and frequency band information of the dedicated frequency range; or receiving, by the UE, the system broadcast message or the RRC control signaling that is sent by the base station by using the dedicated frequency range, where the system broadcast message or the RRC control signaling includes frequency band information of the dedicated frequency range.

With reference to any one of the second aspect to the second possible implementation of the second aspect, in a third possible implementation, the method further includes:

learning, by the UE, the correspondence between the N frequency ranges and the radio interface technologies or the characteristic information of the radio interface technology by using the system broadcast message sent by the base station; or learning, by the UE, the correspondence between the N frequency ranges and the radio interface technologies or the characteristic information of the radio interface technology by using the RRC signaling sent by the base station; or learning, by the UE, the correspondence between the N frequency ranges and the radio interface technologies or the characteristic information of the radio interface technology by using a Media Access Control MAC control element CE; or learning, by the UE, the correspondence between the N frequency ranges and the radio interface technologies or the characteristic information of the radio interface technology by using a physical downlink control channel PDCCH.

With reference to the second aspect, in a fourth possible implementation, before the receiving, by the UE, indication information sent by the base station, the method further includes:

receiving, by the UE, first indication information sent by the base station, where the first indication information is used to indicate a frequency range into which a signaling radio bearer SRB of the UE needs to be mapped;

mapping, by the UE, the SRB of the UE into the frequency range into which the SRB needs to be mapped; and transmitting, by the UE, RRC signaling with the base station by using a radio interface technology supported by the frequency range into which the SRB is mapped, where the RRC signaling is used to establish the DRB of the UE.

With reference to the second aspect, in a fifth possible implementation, the method further includes:

reading, by the UE, a system broadcast message; and when the system broadcast information is system broadcast information of a common frequency range, accessing, by the UE, a wireless network by using the common frequency range.

With reference to the second aspect, in a sixth possible implementation, the method further includes:

reading, by the UE, a system broadcast message; and when the system broadcast information is system broadcast information of a dedicated frequency range and when the dedicated frequency range includes a common channel and a signaling bearer resource, accessing, by the UE, a wireless network by using the dedicated frequency range.

With reference to the second aspect, in a seventh possible implementation, the mapping, by the UE, the DRB of the UE into the frequency range into which the DRB needs to be mapped includes:

learning, by the UE by using the indication information or first indication information that is sent by the base station, the radio interface technology supported by the frequency range into which the DRB needs to be mapped; and mapping, by the UE, the DRB into the radio interface technology supported by the frequency range into which the DRB needs to be mapped.

With reference to the fourth possible implementation of the second aspect, in an eighth possible implementation, the mapping, by the UE, the SRB of the UE into the frequency range into which the SRB needs to be mapped includes:

learning, by the UE by using the first indication information sent by the base station, the radio interface technology supported by the frequency range into which the SRB needs to be mapped; and mapping, by the UE, the SRB into the radio interface technology supported by the frequency range into which the SRB needs to be mapped.

A third aspect of the embodiments of the present disclosure provides a base station device, where the base station device may include:

a processing unit, configured to divide a frequency band of a cell into N frequency ranges, where each of the N frequency ranges supports one radio interface technology, and the cell supports at least two radio interface technologies; and a transceiver unit, configured to send radio resource configuration information of the N frequency ranges and random access resource information of the cell to UE, where the random access resource information is used to instruct the UE to access the cell or instruct the UE to perform uplink synchronization with the cell; where the processing unit is further configured to map a service radio bearer DRB of the UE into at least one frequency range of the N frequency ranges, where each of the DRB is corresponding to one of the at least one frequency range, and each of the at least one frequency range is corresponding to at least one of the DRB; and the transceiver unit is further configured to transmit, by using a radio interface technology supported by the frequency range into which the DRB is mapped, a service carried on the DRB with the UE; where N is an integer, and N≥2.

Optionally, the radio resource configuration information is at least one of frequency band information, a correspondence between the N frequency ranges and radio interface technologies, or characteristic information of the radio interface technology.

With reference to the third aspect, in a first possible implementation, the frequency range includes a common frequency range and a dedicated frequency range, where the common frequency range is a frequency range shared by radio interface technologies supported by the N frequency ranges, and includes a radio resource required by a common channel, or a radio resource required by a common channel and a signaling radio bearer SRB; and the dedicated frequency range is a frequency range used by the radio interface technology individually, and the dedicated frequency range carries a radio resource required by a DRB.

With reference to the third aspect, in a second possible implementation, the common frequency range further includes a radio resource required by a DRB; and the dedicated frequency range further includes a radio resource required by an SRB.

With reference to the third aspect, in a third possible implementation, the frequency range includes a dedicated frequency range, where the dedicated frequency range is a frequency range used by the radio interface technology individually, and includes a common channel, a radio resource required by an SRB, and a radio resource required by a DRB.

With reference to any one of the first to the third possible implementations of the third aspect, in a fourth possible implementation, the common channel includes a synchronization channel, a cell-specific reference signal, a broadcast channel, a paging channel, or a random access channel.

With reference to the third aspect, in a fifth possible implementation, the processing unit is further configured to map an SRB of the UE into at least one frequency range of the N frequency ranges, where each of the SRB is corresponding to one of the at least one frequency range, and each of the at least one frequency range is corresponding to at least one of the SRB;

the transceiver unit is further configured to send first indication information to the UE, where the first indication information is used to indicate, to the UE, a frequency range into which the SRB needs to be mapped; and the transceiver unit is further configured to send RRC signaling to the UE by using a radio interface technology supported by the frequency range into which the SRB is mapped, where the RRC signaling is used to establish the DRB of the UE.

With reference to the third aspect, in a sixth possible implementation, the transceiver unit is specifically configured to:

send the frequency band information of the N frequency ranges to the UE by using a system broadcast message or RRC control signaling.

With reference to the sixth possible implementation of the third aspect, in a seventh possible implementation, the transceiver unit is specifically configured to:

send the system broadcast message or the RRC control signaling to the UE by using a common frequency range, where the system broadcast message or the RRC control signaling includes frequency band information of the common frequency range and frequency band information of a dedicated frequency range; or send the system broadcast message or the RRC control signaling to the UE by using a dedicated frequency range, where the system broadcast message or the RRC control signaling includes frequency band information of the dedicated frequency range.

With reference to the third aspect, in an eighth implementation, the characteristic information of the radio interface technology includes a multiple access mode of the radio interface technology, a frame structure of the radio interface technology, a physical channel characteristic of the radio interface technology, an uplink-downlink subframe configuration of the radio interface technology, or a physical channel resource configuration of the radio interface technology.

A fourth aspect of the embodiments of the present disclosure provides a terminal device, where the terminal device is configured to support a method for using a radio interface technology; a base station divides a frequency band of a cell into N frequency ranges, each of the N frequency ranges supports one radio interface technology, and the cell supports at least two radio interface technologies; and the terminal device includes:

a transceiver unit, configured to receive radio resource configuration information of the N frequency ranges and random access resource information of the cell that are sent by the base station, where the random access resource information is used to instruct the UE to access the cell or instruct the UE to perform uplink synchronization with the cell; and a processing unit, configured to access a wireless network or perform uplink synchronization according to the random access resource of the cell sent by the base station; where the transceiver unit is further configured to receive indication information sent by the base station, where the indication information is used to indicate a frequency range into which a data radio bearer DRB of the UE needs to be mapped;

the processing unit is further configured to map the DRB of the UE into the frequency range into which the DRB needs to be mapped; and the transceiver unit is further configured to transmit, by using a radio interface technology supported by the frequency range into which the DRB is mapped, a service carried on the DRB with the base station; where N is an integer, and N≥2.

Optionally, the radio resource configuration information is at least one of frequency band information, a correspondence between the N frequency ranges and radio interface technologies, or characteristic information of the radio interface technology.

With reference to the fourth aspect, in a first possible implementation, the N frequency ranges include a common frequency range and a dedicated frequency range, or include a dedicated frequency range; and the transceiver unit is specifically configured to receive, from a system broadcast message or Radio Resource Control RRC signaling that is sent by the base station, the frequency band information of the N frequency ranges that is sent by the base station.

With reference to the first possible implementation of the fourth aspect, in a second possible implementation, the transceiver unit is specifically configured to:

receive the system broadcast message or the RRC control signaling that is sent by the base station by using the common frequency range, where the system broadcast message or the RRC control signaling includes frequency band information of the common frequency range and frequency band information of the dedicated frequency range; or receive the system broadcast message or the RRC control signaling that is sent by the base station by using the dedicated frequency range, where the system broadcast message or the RRC control signaling includes frequency band information of the dedicated frequency range.

With reference to any one of the fourth aspect to the second possible implementation of the fourth aspect, in a third possible implementation, the device further includes:

the transceiver unit is further configured to receive the correspondence between the N frequency ranges and the radio interface technologies or the characteristic information of the radio interface technology by using the system broadcast message sent by the base station; or the transceiver unit is further configured to receive the correspondence between the N frequency ranges and the radio interface technologies or the characteristic information of the radio interface technology by using the RRC signaling sent by the base station; or the transceiver unit is further configured to receive the correspondence between the N frequency ranges and the radio interface technologies or the characteristic information of the radio interface technology by using a Media Access Control MAC control element CE sent by the base station; or the transceiver unit is further configured to receive the correspondence between the N frequency ranges and the radio interface technologies or the characteristic information of the radio interface technology by using a physical downlink control channel PDCCH sent by the base station.

With reference to the fourth aspect, in a fourth possible implementation, the transceiver unit is further configured to receive first indication information sent by the base station, where the first indication information is used to indicate a frequency range into which a signaling radio bearer SRB of the UE needs to be mapped;

the processing unit is further configured to map the SRB of the UE into the frequency range into which the SRB needs to be mapped; and the transceiver unit is further configured to transmit RRC signaling with the base station by using a radio interface technology supported by the frequency range into which the SRB is mapped, where the RRC signaling is used to establish the DRB of the UE.

With reference to the fourth aspect, in a fifth possible implementation, the transceiver unit is further configured to read a system broadcast message; and when the system broadcast information is system broadcast information of a common frequency range, the processing unit is further configured to access a wireless network by using the common frequency range.

With reference to any one of the fourth aspect to the second possible implementation of the fourth aspect, in a sixth possible implementation, the processing unit is specifically configured to:

learn, by using the indication information that is sent by the base station and that is received by the transceiver unit, the radio interface technology supported by the frequency range into which the DRB needs to be mapped, and map the DRB into the radio interface technology supported by the frequency range into which the DRB needs to be mapped.

With reference to the fourth possible implementation of the fourth aspect, in a seventh possible implementation, that the processing unit is configured to map the SRB of the UE into the frequency range into which the SRB needs to be mapped includes:

the processing unit is further configured to: learn, by using the first indication information that is sent by the base station and that is received by the transceiver unit, the radio interface technology supported by the frequency range into which the SRB needs to be mapped, and map the SRB into the radio interface technology supported by the frequency range into which the SRB needs to be mapped.

A fifth aspect of the embodiments of the present disclosure provides a communications system, where the communications system may include:

the base station device according to any one of the third aspect to the sixth possible implementation of the third aspect of the embodiments of the present disclosure, the terminal device according to any one of the fourth aspect to the third possible implementation of the fourth aspect of the embodiments of the present disclosure, and a service oriented radio (SOR) controller that is configured for performing radio resource control by the system, where the SOR controller is specifically configured to:

determine a frequency range used for a service in the system, so that the base station maps, into the frequency range that needs to be mapped, a DRB on which the service is carried; and determine a frequency range, used by a radio interface technology, of a cell, so that the base station divides or re-divides the frequency range of the cell.

A sixth aspect of the embodiments of the present disclosure provides a method for using a radio interface technology, where the method may include:

obtaining, by an SOR controller, cell resource information, service information, and a service requirement from a network element or a logical unit;

determining, by the SOR controller according to the cell resource information, the service information, and the service requirement, a frequency range required by a service; and informing, by the SOR controller, the specified network element or logical unit of the frequency range used for transmitting the service, where the network element or the logical unit includes a base station, a core network element, or a service server.

According to the embodiments of the present disclosure, a frequency range used by each radio interface technology may be planned within a whole frequency range of a cell, a frequency band of the cell may be divided into multiple frequency ranges, and radio resources that are used by a common channel, a signaling radio bearer, and a service bearer in a communications system may be planned in a frequency domain, so that flexibility of radio resource configuration is improved, thereby improving radio resource utilization.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

FIG. 2 is a flowchart of a method for using a radio interface technology according to an embodiment of the present disclosure;

FIG. 3A is a schematic diagram of configuring a center frequency for a common frequency range according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

In the prior art, there is a communications system in which a same radio interface technology is used for multiple frequency ranges. For example, in a carrier aggregation technology in a Long Term Evolution (LTE) system, multiple cells with different frequency bands are configured for a base station, and an LTE technology is used for all the cells with different frequency bands. The base station may configure the multiple cells with different frequency bands as serving cells for UE, and both the base station and the UE may use radio resources of one primary serving cell and one or more secondary serving cells for communication.

For another example, in a bearer separation technology in an LTE technology, multiple cells may be configured as serving cells for UE. The multiple cells originate from two or more different base stations, and frequency ranges into which the multiple cells belong may be the same or may be different. The serving cells of the UE include a primary serving cell of a master eNodeB and a secondary serving cell of one or more secondary eNodeBs. A secondary serving cell of each secondary eNodeB further includes a primary secondary serving cell configured with a physical uplink control channel (PUCCH) on which the UE sends uplink control information.

An LTE system is used as a scenario in the embodiments of the present disclosure.

Figure 1:
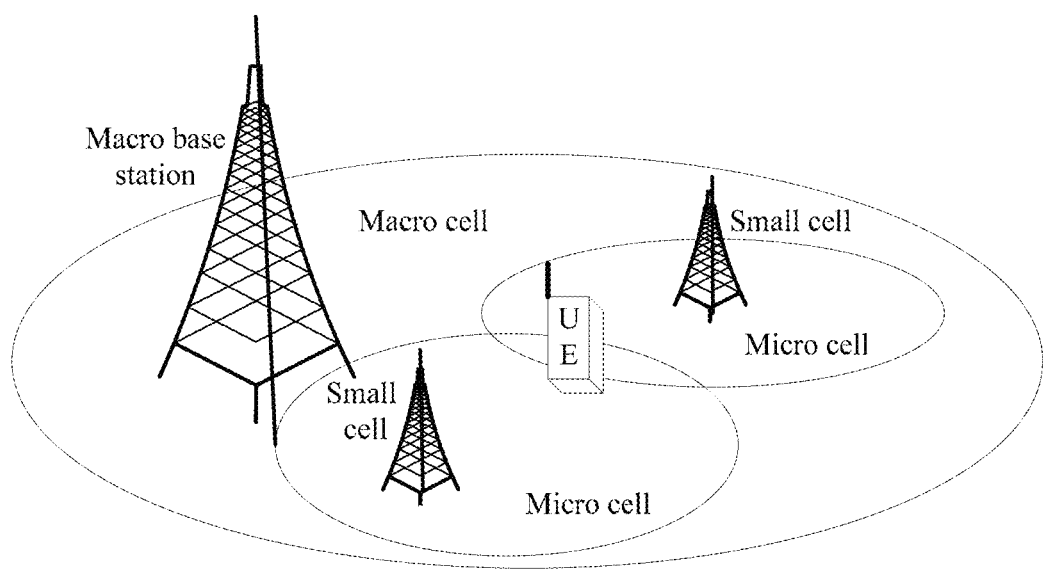
FIG. 1 is a schematic diagram of an application scenario according to an embodiment of the present disclosure.

To better understand a scenario applicable to the present disclosure, FIG. 1 shows an application scenario. As shown in FIG. 1, user equipment (UE) is located in a coverage area of one or more cells or carriers provided by a macro base station or a small cell, and there may be one or more cells that serve the UE. The UE may be served by both a macro cell of the macro base station and a micro cell of the small cell. When there are multiple serving cells of the UE, the UE may work in a carrier aggregation (CA) transmission mode, in a dual connectivity (DC); a carrier in CA is provided by more than one base station) transmission mode, or in a coordinated multiple point (CoMP) transmission mode. At least one cell of the serving cells provides more than one radio interface technology for the UE.

However, the scenario applicable to the present disclosure not only includes a case in which the UE is within coverage of multiple cells, but also includes a case in which the UE is located only in a coverage area of one cell. Further, the present disclosure is not only applicable to an LTE system, but also applicable to a universal mobile telecommunications system (UMTS), a CDMA2000 system, a wireless local area network (WLAN) system, a future 5G (The fifth generation) wireless communications system, or the like.

The embodiments of the present disclosure use an example in which two radio interface technologies are provided for one cell for description, and are also applicable to a case in which more than two radio interface technologies are provided for one cell.

In the specification, claims, and accompanying drawings of the present disclosure, the terms "first", "second", "third", "fourth", and so on are intended to distinguish between different objects but do not indicate a particular order. Moreover, the terms "including", "comprising", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Embodiment 1

Embodiment 1 of the present disclosure provides a method for using a radio interface technology, so as to improve flexibility of resource configuration for multiple radio interface technologies, thereby improving radio resource utilization.

The implementation method in Embodiment 1 shown in FIG. 2 may include the following steps.

201. A base station divides a frequency band of a cell into N frequency ranges, where each of the N frequency ranges supports one radio interface technology, the cell supports at least two radio interface technologies, N is an integer, and N≥2.

When network planning is performed for a system, a whole frequency band of a cell may be divided into N frequency ranges. The base station establishes a correspondence between each of the N frequency ranges and the radio interface technology according to a network planning result, sets frequency band information for each frequency range, and sets characteristic information for the radio interface technology.

The frequency range planned for the system includes a common frequency range and a dedicated frequency range, or includes only a dedicated frequency range.

The common frequency range is a frequency range shared by radio interface technologies supported by the N frequency ranges, and includes a radio resource required by a common channel, or a radio resource required by a common channel and a signaling bearer SRB. The common channel includes a synchronization channel, a cell-specific reference signal, a broadcast channel, a paging channel, or a random access channel. The common frequency range may further include a radio resource required by a DRB.

All user equipments UEs in the cell may complete, by using the common frequency range, a process related to initial network access.

The UE may receive a system paging message by using the paging channel of the common frequency range.

After reading system broadcast information of the cell, the UE may access a wireless network by using the random access channel of the common frequency range, or may access a wireless network by using a random access channel of the dedicated frequency range.

The dedicated frequency range is a frequency range used by each radio interface technology individually, carries a radio resource used for service transmission, and is responsible for transmitting a specific service. When a network or a user initiates a service, the base station establishes, in the dedicated frequency range or the common frequency range, a data radio bearer DRB that carries service transmission.

After the UE accesses the network, the base station needs to establish a signaling bearer of a user in the common frequency range or the dedicated frequency range of the cell before establishing the DRB, and transmit an RRC signaling message between the base station and the user by using the common frequency range or the dedicated frequency range. If the signaling bearer of the user has been established, the base station may not need to establish a signaling bearer after the UE accesses the network.

When the N frequency ranges of the cell include only the dedicated frequency range, in addition to the DRB, the dedicated frequency range further includes a radio resource for carrying a common channel and an SRB. The common channel includes a synchronization channel, a cell-specific reference signal, a broadcast channel, a paging channel, or a random access channel. The user completes initial random access on the random access channel of the dedicated frequency range.

When the user performs initial network access, if the dedicated frequency range includes the common channel, the user may select, according to a type of a service to be initiated, a dedicated frequency range for use, and complete initial network access in the dedicated frequency range. In addition, when the user accesses the network, the base station may further establish an SRB in the dedicated frequency range.

202. The base station sends frequency band information of the N frequency ranges, a correspondence between the N frequency ranges and radio interface technologies, or characteristic information of the radio interface technology, and random access resource information of the cell to the UE, where the random access resource information is used by UE to access the cell or perform uplink synchronization with the cell.

After the UE is powered on, the synchronization channel of the common frequency range may be used to perform system synchronization and keep system synchronization. After system synchronization is performed, the user may obtain a system broadcast of the cell from a system broadcast message of the common frequency range. The system broadcast message may include all common information of the cell. For example, the system broadcast message of the common frequency range includes frequency band information of the dedicated frequency range in addition to a bandwidth of a frequency band of the common frequency range. Therefore, the user may learn the frequency band information of the dedicated frequency range of the cell by using the system broadcast message of the common frequency range. The frequency band information includes a bandwidth and a center frequency of the dedicated frequency range. The system broadcast message of the common frequency range includes a correspondence between the common frequency range and the radio interface technology and a correspondence between the dedicated frequency range and the radio interface technology, and includes the random access channel of the common frequency range and the random access channel of the dedicated frequency range. The system information of the common frequency range may further include related characteristic information of the radio interface technology supported by the dedicated frequency range. The system broadcast message of the common frequency range may alternatively include only cell information related to the common frequency range, for example, include only frequency band information of the common frequency range, a correspondence between the common frequency range and the radio interface technology, and the random access channel of the common frequency range. If the system broadcast information of the common frequency range does not include frequency band information of the dedicated frequency range or related characteristic information of the radio interface technology supported by the dedicated frequency range, after the UE successfully accesses the network by using the common frequency range, the base station may configure the frequency band information of the dedicated frequency range for the UE by using RRC signaling.

When the N frequency ranges obtained by means of division by the base station include only the dedicated frequency range, the user uses the synchronization channel of the dedicated frequency range, to perform system synchronization and keep system synchronization. The user obtains the common information of the cell by using system information of the dedicated frequency range. However, the dedicated frequency range can broadcast only common information, related to the dedicated frequency range, of the cell, such as the frequency band information of the dedicated frequency range, the correspondence between the dedicated frequency range and the radio interface technology, or the random access channel of the dedicated frequency range. The user may also listen to a paging message, sent by the base station, of the dedicated frequency range.

The base station sends the random access channel RACH of the cell to the user by using a system broadcast message. The base station may broadcast RACH information by using the system information of the common frequency range, where the random access resource is located in the common frequency range or located in the dedicated frequency range. Alternatively, the base station may broadcast RACH information by using the system information of the dedicated frequency range, where the random access resource is located in the dedicated frequency range.

203. The base station maps a service bearer DRB of the UE into at least one frequency range of the N frequency ranges, where each of the DRB is corresponding to one of the at least one frequency range, and each of the at least one frequency range is corresponding to at least one of the DRB.

After the UE accesses the network, service transmission may be initiated. Service transmission may be initiated by the network or may be initiated by the UE. A mapping relationship between a DRB used for transmitting a service and a radio interface technology needs to be determined, and is used by the base station to transmit the service with the UE. The mapping relationship between the DRB and the radio interface technology is established by the base station. The base station sends the mapping relationship to the UE.

The base station obtains, according to a service request initiated by the UE, a type of a service that initiates the request, and establishes a mapping relationship between the service and a frequency range according to the service type, so as to establish a mapping relationship between a DRB on which the service is carried and a frequency range. Because the mapping relationship between the frequency range and the radio interface technology is determined by the base station in step 201, a correspondence between the service and the radio interface technology and a correspondence between the DRB on which the service is carried and the radio interface technology may also be determined. The DRB may be corresponding to the dedicated frequency range or the common frequency range. The base station may determine the correspondence between the service and the radio interface technology when the UE initiates the service request, or may have determined the correspondence between the service and the radio interface technology before the UE initiates the service request. For each DRB of the UE, the base station specifies a frequency range into which the DRB is mapped. The base station may map all DRBs of the UE into a same frequency range or different frequency ranges. Each DRB can be mapped only into one frequency range.

It should be noted that, when the UE initially accesses the network, that is, before the base station maps the DRB of the UE into a frequency range into which the DRB needs to be mapped, the base station needs to establish a signaling bearer SRB for the UE, and map the SRB of the UE into at least one frequency range of the N frequency ranges. Each of the SRB is corresponding to one of the at least one frequency range, and each of the at least one frequency range is corresponding to at least one of the SRB. The base station sends Radio Resource Control RRC signaling to the UE by using a radio interface technology supported by the frequency range into which the SRB is mapped. The RRC signaling is used to establish the service bearer of the UE.

When the UE accesses the network, the base station establishes a mapping relationship between the SRB of the UE and a frequency range. Because the mapping relationship between each frequency range and the radio interface technology is determined by the base station in step 201, a correspondence between the SRB of the UE and the radio interface technology may also be determined.

The base station sends first indication information such as RRC signaling to the UE. The first indication information is used to indicate, to the UE, a frequency range into which the SRB needs to be mapped, or the first indication information is used to indicate, to the UE, a frequency range into which the SRB needs to be mapped and a frequency range into which at least one of the DRB of the UE needs to be mapped.

If the frequency ranges of the cell include only a dedicated frequency range and exclude a common frequency range, the base station maps the SRB of the UE into a corresponding dedicated frequency range. As described in step 401, it can be understood that, in this case, the UE selects a corresponding dedicated frequency range according to the type of the service to be initiated, and accesses the network. Therefore, the base station maps the SRB of the UE into the dedicated frequency range selected by the UE. For each SRB of the UE, the base station specifies a frequency range into which the SRB is mapped. The base station may map all SRBs of the UE into a same frequency range or different frequency ranges. Each SRB can be mapped only into one frequency range.

204. The base station sends indication information to the UE, where the indication information is used to indicate a frequency range into which the DRB needs to be mapped.

After determining the correspondence between the service and the radio interface technology, the base station sends the indication information such as RRC signaling to the UE, and informs the UE of the correspondence between the DRB on which the service is carried and the radio interface technology by using the indication information. The radio interface technology is a radio interface technology supported by the frequency range selected by the base station for the service.

205. The base station transmits, by using a radio interface technology supported by the frequency range into which the DRB is mapped, a service carried on the service bearer DRB with the UE.

The base station transmits, by using the frequency range that is determined in step 203 and into which each DRB is mapped and the radio interface technology supported by the frequency range, the service carried on the DRB with the UE.

It should be noted that the present disclosure imposes no limitation on an execution sequence of the foregoing steps. For example, the frequency band information of the N frequency ranges, the correspondence between the N frequency ranges and the radio interface technologies, or the characteristic information of the radio interface technology may be sent according to different cases at any time within a period that the solution is performed.

It can be learnt that, according to the method for using multiple radio interface technologies that is provided in Embodiment 1 of the present disclosure, a frequency range used by each radio interface technology may be planned within a whole frequency range of a cell, and resources that are used by a common channel, a signaling radio bearer, and a service bearer may be planned in a frequency domain, so that flexibility of radio resource configuration is improved, thereby improving radio resource utilization.

Embodiment 2

Embodiment 2 of the present disclosure provides a method for using a radio interface technology, so as to improve flexibility of resource configuration for multiple radio interface technologies, thereby improving radio resource utilization.

In the method described in Embodiment 1, a base station divides a frequency band of a cell into N frequency ranges, where N is an integer, and N≥2. One radio interface technology is used for each of the N frequency ranges, and each cell supports at least two radio interface technologies. The cell supports at least two different radio interface technologies. The different radio interface technologies are radio interface technologies that have different frame structures or different multiple access modes, or that use different hybrid automatic repeat request (HARQ) round trip times.

In Embodiment 2 of the present disclosure, a base station divides a frequency band of a cell into two frequency ranges. Each frequency range is corresponding to one radio interface technology.

It is assumed that the cell supports two different radio interface technologies. For example, the two radio interface technologies have different multiple access modes. The multiple access modes include OFDMA, single carrier frequency division multiple access SC-FDMA, sparse code multiple access (SCMA), and the like. In some specific feasible implementations, each of the two access technologies may use an OFDM modulation technology. However, one radio interface technology optimizes a large-connection machine-to-machine communication (M2M) service, for example, an SCMA mode, and the other radio interface technology uses an OFDM access mode in an existing LTE technology. A principle of the SCMA technology is to use a code domain non-orthogonal extension and superposition manner to accommodate more service users while a time-frequency resource remains the same, so that an overall network throughput can be increased on the premise that user experience is not affected. Similar to a CDMA technology, the SCMA technology allows, in a manner for extending frequency domain codewords, multiple codewords to be superposed in one system resource block and then transmitted, so that an information transmission rate of a multicarrier system is increased. The frequency domain codewords are superposed in a low-density parity-check (LDPC) sparse matrix manner. A receive end may use a decoder with relatively low complexity to decode information about the codewords, so as to restore original information.

For another example, the two radio interface technologies have different frame structures. The different frame structures are expressed by different frame structure characteristics, including a transmission time interval (TT), a cyclic prefix (CP) length, duration of an OFDM symbol, a subcarrier spacing, and a TDD uplink-downlink subframe configuration. In some specific feasible implementations, in the two radio interface technologies, one radio interface technology optimizes an ultra-low latency M2M service, and uses a TTI length 0.1 ms different from that used in an existing LTE technology; the other radio interface technology uses a TTI length 1 ms that is used in the existing LTE technology.

For still another example, the two radio interface technologies have a same frame structure, but hybrid automatic repeat request HARQ round trip times (RRT) used by the two radio interface technologies are different. For example, an HARQ RTT used by one radio interface technology is of a length of four TTIs, and an HARQ RTT used by the other radio interface technology is of a length of eight TTIs.

For yet another example, the two radio interface technologies are a radio interface technology used for a unicast service in an existing LTE radio interface technology and a radio interface technology used for a Multimedia Broadcast Multicast Service (MBMS), in the existing LTE radio interface technology, respectively. To avoid interference between frequency ranges that is caused by frequency division by using different radio interface technologies, a filtering technology may be used for different frequency ranges, such as filtered OFDM, filter bank multicarrier (FBMC), generalized frequency division multiplexing (GFDM), or other existing technologies.

The base station establishes a correspondence between the two frequency ranges and the radio interface technologies according to a network planning result, sets frequency band information for each frequency range, and sets characteristic information for the radio interface technology. Then, the base station sends frequency band information of the frequency ranges that are obtained by means of division, the correspondence between the frequency ranges and the radio interface technologies, or characteristic information of the radio interface technology to UE. Subsequent steps implemented by the base station are consistent with those in Embodiment 1. Details are not described herein again.

Embodiment 3

Embodiment 3 of the present disclosure provides a method for using a radio interface technology, so as to improve flexibility of resource configuration for multiple radio interface technologies, thereby improving radio resource utilization.

In the method described in Embodiment 1, a base station divides a frequency band of a cell into N frequency ranges, where N is an integer, and N≥2. One radio interface technology is used for each of the N frequency ranges, and each cell supports at least two different radio interface technologies. The different radio interface technologies are radio interface technologies that have different frame structures or different multiple access modes, or that use different hybrid automatic repeat request HARQ round trip times.

The frequency range planned for a system includes a common frequency range and a dedicated frequency range, or includes only a dedicated frequency range.

The common frequency range is a frequency range shared by radio interface technologies supported by the N frequency ranges, and includes a radio resource required by a common channel, or a radio resource corresponding to a common channel and an SRB. The common channel includes a synchronization channel, a cell-specific reference signal, a broadcast channel, a paging channel, or a random access channel. The common frequency range may further include a radio resource required by a DRB. All UEs in the cell may complete, by using the common frequency range, a process related to initial network access.

The dedicated frequency range is a frequency range used by each radio interface technology individually, carries a radio resource used for service transmission, and is responsible for transmitting a specific service. When a network or a user initiates a service, the base station establishes, in the dedicated frequency range or the common frequency range, a data radio bearer DRB that carries service transmission. The dedicated frequency range may further include a radio resource required by an SRB.

Embodiment 3 of the present disclosure provides a method for configuring a center frequency for the common frequency range and the dedicated frequency range when the N frequency ranges include the common frequency range and the dedicated frequency range. There are two configuration manners.

A first manner is: A location of the center frequency of the common frequency range is invariable and is a central location of the frequency band of the cell. Specifically, referring to FIG. 3A, the system divides a whole frequency band of a cell into four parts: three dedicated frequency ranges and one common frequency range. The common frequency range is in a central location of the whole frequency band of the cell, and the three dedicated frequency ranges are located on two sides of the common frequency range in terms of frequency domain locations.

The configuration manner can simplify a cell search process of UE and a process of downlink synchronization processing. If the system reconfigures a radio interface technology and a service resource, a resource location of the dedicated frequency range corresponding to the radio interface technology or the service may change. Therefore, a location of the radio interface technology or the service in the frequency band of the cell changes, and a frequency band corresponding to the radio interface technology or the service is in multiple locations of the frequency band of the cell. For example, when a bandwidth of a mobile broadband (MBB) service is reduced after system reconfiguration, the system reserves some frequency bands of the frequency band of the cell for a latency critical MBB service. In this case, a frequency band corresponding to the latency critical MBB service is in an original location of the latency critical MBB service and the original MBB location that has been reserved; therefore, the frequency band corresponding to the latency critical MBB service may be distributed in locations that are on the left and right sides of the common frequency range.

A second manner is: The center frequency of the common frequency range is not in a central location of the frequency band of the cell, and a central location of the common frequency range is flexible and variable within the frequency band of the cell. Specifically, referring to FIG. 3B, the system divides a whole frequency band of a cell into four parts: three dedicated frequency ranges and one common frequency range. The common frequency range is not in a central location of the frequency band of the cell.

In the second configuration manner, the common frequency range may not be in a central location of a cell bandwidth. This is conducive to flexible resource allocation of frequency bands corresponding to different radio interface technologies or different services, for example, conducive to resolving a problem in the first configuration manner that a frequency band corresponding to the radio interface technology or the service is in multiple locations of the frequency band of the cell.

A radio frequency processing process of the UE in the second configuration manner is different from that in the first configuration manner. For example, in the second configuration manner, when the UE performs initial access, a transceiver of the UE first needs to be tuned in to a center frequency of the common frequency range for implementing processes of cell search, synchronization processing, and random access, and the transceiver may be tuned in to another frequency channel for performing receiving and sending when a service is subsequently initiated. In the first configuration manner, when the UE performs initial access, a transceiver of the UE is tuned in to a center frequency of the common frequency range. Because the center frequency of the common frequency range is the center frequency of the frequency band of the cell, when the UE subsequently initiates a service, the center frequency for the transceiver of the UE may keep unchanged, so that a radio frequency conversion latency can be avoided.

All UEs in the cell may complete, by using the common frequency range, a process related to wireless network access.

As described in Embodiment 1, the base station sends frequency band information of the N frequency ranges, a correspondence between the N frequency ranges and radio interface technologies, or characteristic information of the radio interface technology, and random access resource information of the cell to the UE. The UE accesses the cell or performs uplink synchronization with the cell according to the random access resource information.

After the UE accesses a network and when a service is initiated, the base station maps each service bearer DRB of the UE into a specified frequency range of the multiple frequency ranges, and transmits the service with the UE by using a radio interface technology supported by the frequency range.

After the UE accesses the network, service transmission may be initiated. Service transmission may be initiated by the network or may be initiated by the UE. A mapping relationship between a DRB used for transmitting a service and a radio interface technology needs to be determined, and is used by the base station to transmit the service with the UE. The mapping relationship between the DRB and the radio interface technology is established by the base station. The base station sends the mapping relationship to the UE.

For each DRB of the UE, the base station specifies a frequency range into which the DRB is mapped. The base station may map all DRBs of the UE into a same frequency range or different frequency ranges. However, one DRB can be mapped only into one frequency range.

After determining a correspondence between the service and the radio interface technology, the base station informs, by using indication information such as RRC signaling, the UE of the frequency range into which the DRB needs to be mapped, where the DRB is used to carry the service. The UE maps the DRB for the service into the frequency range, and transmits the service with the base station by using the radio interface technology supported by the frequency range.

The mapping the DRB of the UE into the frequency range includes: using, by the DRB, a physical layer resource of the frequency range; or using, by the DRB, a physical layer resource of the frequency range and a Media Access Control MAC layer entity corresponding to the frequency range.

As described in Embodiment 1, if the UE initially accesses the network, the base station needs to map an SRB of the UE into at least one frequency range of the N frequency ranges when the UE accesses the wireless network. Each of the SRB is corresponding to one of the at least one frequency range, and each of the at least one frequency range is corresponding to at least one of the SRB. The base station sends Radio Resource Control RRC signaling to the UE by using a radio interface technology supported by the frequency range into which the SRB is mapped. The RRC signaling is used to establish the service bearer of the UE. For each SRB of the UE, the base station specifies a frequency range corresponding to the SRB. The base station may map all SRBs of the UE into a same frequency range or different frequency ranges. However, one SRB can be mapped only into one frequency range.

The base station informs, by using first indication information such as RRC signaling, the UE of the frequency range into which the SRB of the UE needs to be mapped, or informs the UE of the frequency range into which the SRB of the UE needs to be mapped and a frequency range into which at least one of the DRB of the UE needs to be mapped. After receiving the RRC signaling, the UE maps the SRB of the UE into the frequency range, and transmits the Radio Resource Control RRC signaling with the base station by using the radio interface technology supported by the frequency range.

The mapping the SRB of the UE into the frequency range includes: using, by the SRB, a physical layer resource of the frequency range; or using, by the SRB, a physical layer resource of the frequency range and a Media Access Control MAC layer entity corresponding to the frequency range.

Embodiment 4

Embodiment 4 of the present disclosure provides a method for using a radio interface technology. The method for using a radio interface technology includes allocation of frequency band resources of a cell, a method for indicating a frequency range corresponding to a radio interface technology, a process in which UE accesses a system, a process of mapping between a radio bearer of the UE, a radio interface technology, and a frequency range, and modification to a mapping relationship between a radio interface technology and a frequency range.

Figures 3B, 4A:
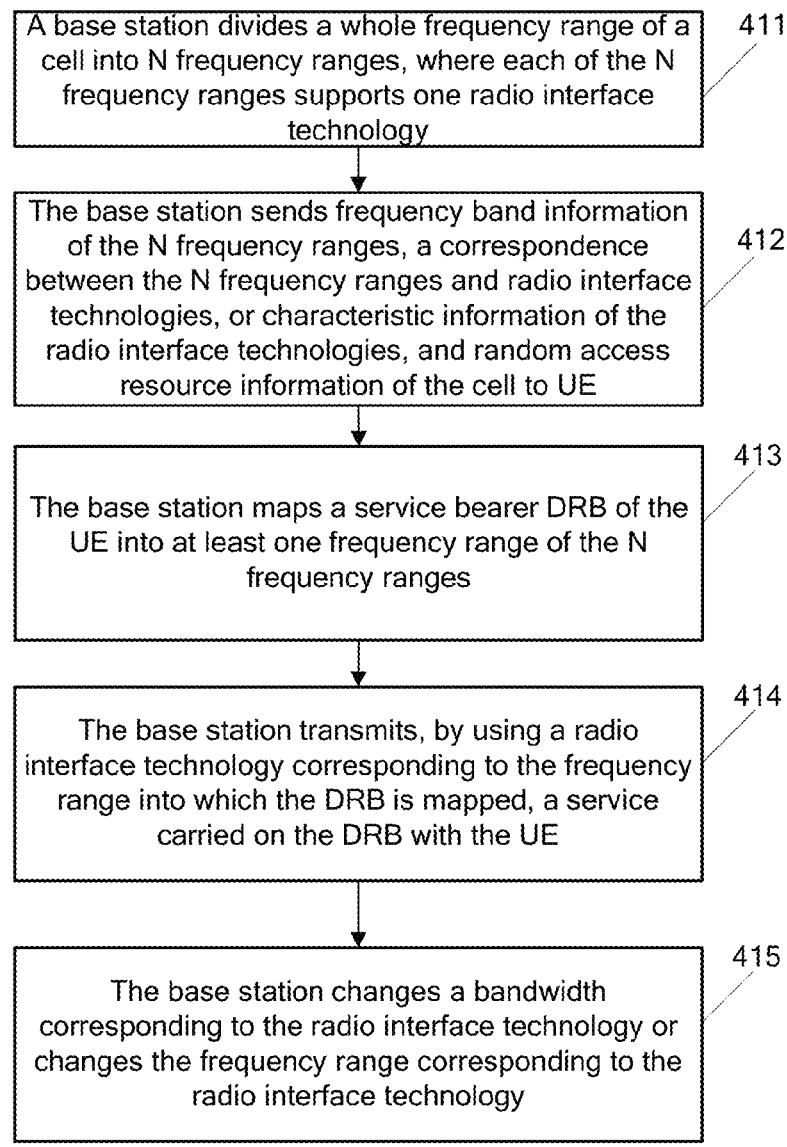
FIG. 3B is a schematic diagram of configuring a center frequency for a common frequency range according to an embodiment of the present disclosure.
FIG. 4A is a flowchart of a method for using a radio interface technology according to an embodiment of the present disclosure.

As shown in FIG. 4A, the method in Embodiment 4 may include the following steps.

411. A base station divides a whole frequency range of a cell into N frequency ranges, where each of the N frequency ranges supports one radio interface technology, the cell supports at least two radio interface technologies, N is an integer, and N≥2.

In this embodiment, the base station divides the whole frequency range of the cell into two frequency ranges, and uses two different radio interface technologies. One radio interface technology is an existing LTE technology, is corresponding to a common frequency range, and is used for transmitting a common channel and a mobile broadband unicast service on a user plane. The other radio interface technology uses a frame structure different from that used in the existing LTE technology. Optionally, the other radio interface technology may further use a different multiple access technology such as SCMA or use a different HARQ RTT, is corresponding to a dedicated frequency range, and is used for transmitting an ultra-low latency M2M service bearer. In this embodiment, a radio interface technology supported by the common frequency range is an LTE radio interface technology. The LTE radio interface technology carries a DRB of a mobile broadband unicast service, and the mobile broadband unicast service uses a radio resource, a MAC entity, and a physical layer (PHY) entity that are used by the LTE technology. Correspondingly, the dedicated frequency range uses a radio interface technology different from the LTE technology. The radio interface technology different from the LTE technology carries a DRB of an ultra-low latency M2M service, and the DRB of the ultra-low latency M2M service uses a radio resource, a MAC entity, and a physical layer (PHY) entity that are used by the radio interface technology that uses a frame structure different from that used in the LTE technology.

Figure 4B:
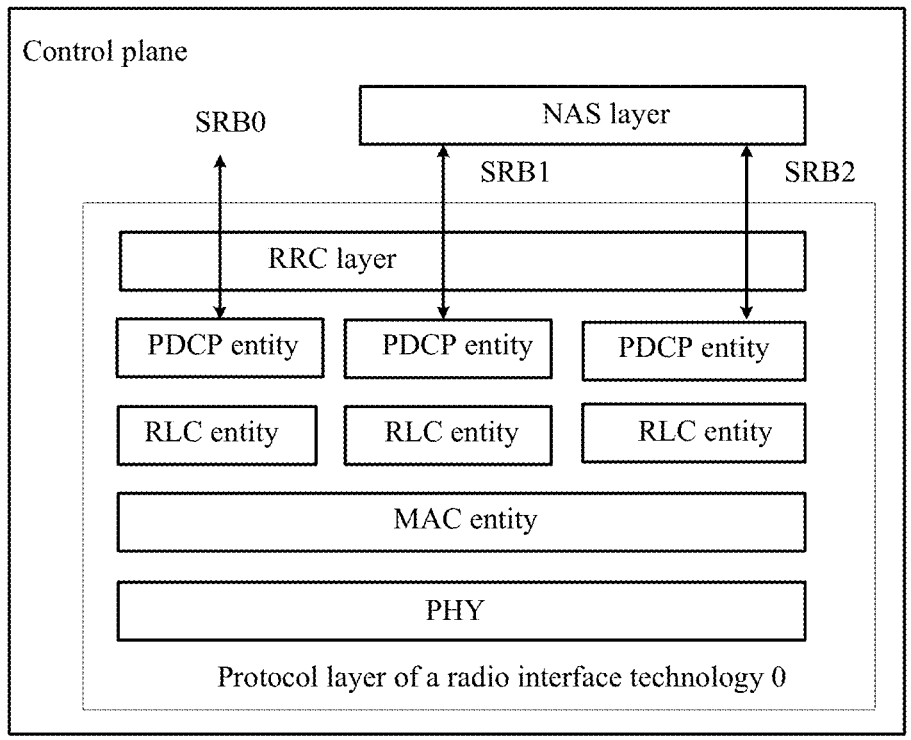
FIG. 4B is a schematic diagram illustrating that a radio interface technology is used individually for a common frequency range according to an embodiment of the present disclosure.

In a method other than the method in Embodiment 4, the common frequency range may not be used for transmitting a service, and a frequency range used for the common channel may be an individual frequency range. For example, the frequency range of the cell is divided into three frequency ranges. A radio interface technology is used individually for the common frequency range, and a radio interface technology is respectively used for the mobile broadband unicast service and the ultra-low latency M2M service. As shown in FIG. 4B, three SRBs on a control plane in the system are mapped into a radio interface technology. The radio interface technology is different from a radio interface technology into which a service is mapped.

412. The base station sends frequency band information of the N frequency ranges, a correspondence between the N frequency ranges and radio interface technologies, or characteristic information of the radio interface technology, and random access resource information of the cell to UE, where the random access resource information is used by the UE to access the cell or perform uplink synchronization with the cell.

The base station may inform the UE of a correspondence between each frequency range and the radio interface technology or the characteristic information of the radio interface technology in one of the following manners:

informing, by the base station, the UE of the correspondence between each frequency range and the radio interface technology or the characteristic information of the radio interface technology by sending a system broadcast message; or informing, by the base station, the UE of the correspondence between each frequency range and the radio interface technology or the characteristic information of the radio interface technology by sending an RRC signaling message; or informing, by the base station, the UE of the correspondence between each frequency range and the radio interface technology or the characteristic information of the radio interface technology by sending a Media Access Control MAC control element CE; or informing, by the base station, the UE of the correspondence between each frequency range and the radio interface technology or the characteristic information of the radio interface technology by sending a physical downlink control channel PDCCH.

Embodiment 4 provides an example of system message content broadcast in the common frequency range. The base station may inform, by using a broadcast message of the common frequency range, the UE of frequency band information of each frequency range, the correspondence between each frequency range and the radio interface technology, and the characteristic information of the radio interface technology supported by the dedicated frequency range. The characteristic information of the radio interface technology includes a type that is of the radio interface technology and that includes a characteristic combination of a multiple access mode, a frame structure, a CP length, a physical channel, and the like; an uplink-downlink subframe configuration; and physical channel resource configuration information specific to a radio interface. In this embodiment, system information of the common frequency range includes:

a master information block (MIB) of the common frequency range, including: a system frame number (SFN) of the common frequency range; an SFN that is the same as that used for the dedicated frequency range or that has an integer multiple relationship with the SFN of the common frequency range; and a bandwidth of the common frequency range;

newly added information elements of a system information block 1 (SIB 1) of the common frequency range, including: an identifier of the radio interface technology supported by the common frequency range; a downlink bandwidth, a start sub-band offset frequency, or a center frequency of the dedicated frequency range; an identifier of the radio interface technology supported by the dedicated frequency range; a type that is of the radio interface technology and that includes a characteristic combination of a multiple access mode, a frame structure, a CP length, a physical channel, and the like; and in a TDD system, further including an uplink-downlink subframe configuration of the dedicated frequency range; and a system information block 2 (SIB 2) of the common frequency range, including but not limited to: a PRACH resource configuration for the radio interface technology supported by the common frequency range; in a frequency division multiplexing (FDD) system, including an uplink bandwidth; and physical layer resource configuration information specific to a radio interface, such as SCMA-related configuration information, where in the FDD system, an uplink bandwidth, included in the system information block 2, used by each radio interface technology may be different from a downlink bandwidth.

After the base station informs the UE of the correspondence between each frequency range and the radio interface technology or the characteristic information of the radio interface technology, the UE may select a corresponding frequency range according to a type of a service to be initiated, and complete a wireless network access process.

The base station sends a random access channel RACH of the cell to a user by using a system broadcast message. The base station may broadcast RACH information by using the system information of the common frequency range. The random access resource may be located in the common frequency range, or may be located in the dedicated frequency range. Alternatively, the base station may broadcast RACH information by using system information of the dedicated frequency range. The random access resource is located in the dedicated frequency range.

The UE obtains RACH resource configuration information from the system information of the common frequency range. The RACH resource configuration information includes a RACH channel time-frequency resource and RACH common resource configuration information. The RACH resource configuration may be located in the common frequency range and/or the dedicated frequency range. The UE implements a random access process according to a random access resource selected by the UE.

A RACH resource in each frequency range is configured according to the characteristic of the radio interface technology supported by each frequency range. Specifically, a RACH channel format, a random access preamble, and the like are configured according to the characteristic of the radio interface technology supported by each frequency range. For example, a RACH resource in the dedicated frequency range is configured according to a frame structure used by the radio interface technology for ultra-low latency M2M.

413. The base station maps a service bearer DRB of the UE into at least one frequency range of the N frequency ranges, where each of the DRB is corresponding to one of the at least one frequency range, and each of the at least one frequency range is corresponding to at least one of the DRB.

414. The base station sends indication information to the UE, where the indication information is used to indicate a frequency range into which the DRB needs to be mapped.

The base station informs, by using the RRC signaling, the UE of the frequency range into which the DRB needs to be mapped, where the DRB is used to carry the service.

The base station may send an RRC connection reconfiguration message to the UE, and configure a mapping relationship between a data radio bearer (DRB) and a radio interface technology. The DRB is mapped into a MAC layer and a physical layer that are of a corresponding radio interface technology. For example, a DRB of the ultra-low latency M2M service is mapped into a radio interface technology corresponding to ultra-low latency M2M, and a DRB of the mobile broadband unicast service is mapped into a radio interface technology in the LTE technology.

Figure 4C:
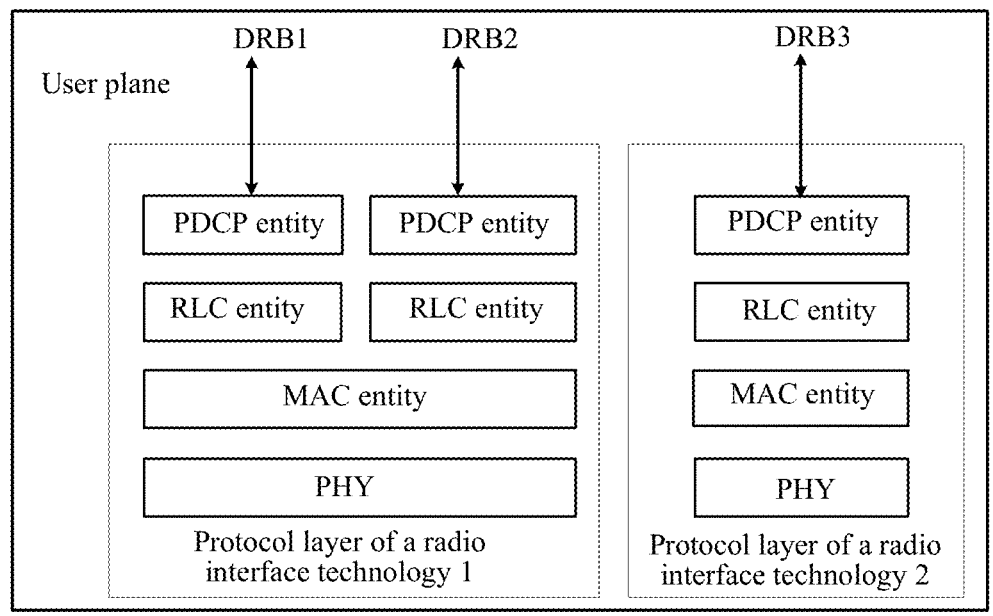
FIG. 4C is a schematic diagram of mapping between a data radio bearer and a radio interface technology according to an embodiment of the present disclosure.

FIG. 4C shows an example of a mapping relationship between a DRB and a radio interface technology. A DRB 1 and a DRB 2 use a radio interface technology 1, are corresponding to a frequency range of the cell, and use a radio resource, a MAC entity, and a PHY entity of the radio interface technology 1. A DRB 3 uses a radio interface technology 2 different from the radio interface technology used by the DRB 1 and the DRB 2, is corresponding to another frequency range of the cell, and uses a radio resource, a MAC entity, and a PHY entity of the radio interface technology 2. In this embodiment, the radio interface technology 1 is an LTE radio interface technology, and the radio interface technology 2 is a machine-to-machine (M2M) radio interface technology; or the radio interface technology 1 is an M2M radio interface technology, and the radio interface technology 2 is an LTE radio interface technology.

It should be noted that, if the UE initially accesses a network, the base station maps an SRB of the UE into at least one frequency range of the N frequency ranges before establishing the DRB. Each of the SRB is corresponding to one of the at least one frequency range, and each of the at least one frequency range is corresponding to at least one of the SRB. The base station transmits Radio Resource Control RRC signaling with the UE by using a radio interface technology supported by the frequency range. The RRC signaling is used to establish the service bearer of the UE.

In the prior art, signaling radio bearers include three SRBs: an SRB 0, an SRB 1, and an SRB 2, and are used to transmit different pieces of control signaling. The SRB 0 mapped into a common control channel (CCCH) is used to transmit control signaling before establishing a dedicated control channel, and the SRB 1 and the SRB 2 that are mapped into a dedicated control channel are used to transmit dedicated control signaling of the UE.

The base station sends the RRC signaling to the UE. The RRC signaling is used to indicate, to the UE, a frequency range into which the SRB needs to be mapped.

Specifically, when the UE initially accesses the cell, the UE sends a Radio Resource Control connection request message to the base station by using the SRB 0. The message is sent to the base station in a message 3 during the random access process. The base station responds to the message of the UE, and sends a Radio Resource Control connection setup message to the UE by using the SRB 0. The base station indicates, in the message, a frequency range into which the SRB 1 needs to be mapped. After establishing the SRB 1 successfully, the UE sends a Radio Resource Control connection setup complete message to the base station by using the SRB 1. The base station sends a Radio Resource Control connection reconfiguration message to the UE by using the SRB 1, and configures the SRB 2 and the service bearer DRB for the UE. The message indicates a frequency range into which the SRB 2 and the service bearer DRB need to be mapped.

If the UE is handed over to a target cell, a target base station sends, to a source base station, the random access resource information, and information about the frequency ranges into which the SRB 1, the SRB 2, and the DRB need to be mapped. The source base station sends, to the UE, a Radio Resource Control connection reconfiguration message that carries mobility control information, and sends the foregoing configuration information of the target base station to the UE.

In a bearer separation system, the Radio Resource Control connection reconfiguration message sent by the base station to the UE may include a frequency range into which a DRB in a secondary serving cell SCell needs to be mapped. In this case, the Radio Resource Control connection reconfiguration message is sent to the UE by using an SRB 1 in a primary serving cell PCell. The Radio Resource Control connection reconfiguration message further includes information about a frequency range, in the SCell, of an SRB 1 or an SRB 2 in the secondary serving cell SCell.

When the UE accesses the network, the frequency ranges into which the foregoing three SRBs need to be mapped are established. Optionally, the base station maps the three SRBs of the UE into the common frequency range.

The base station informs the UE of a correspondence between the SRB of the UE and a radio interface technology by using the RRC signaling message. The radio interface technology is a radio interface technology supported by the frequency range that is selected by the base station in the foregoing step. In this embodiment, the base station may send an RRC connection setup message to the UE, and configure the frequency range into which the signaling radio bearer SRB 1 needs to be mapped. The SRB 1 is mapped into a MAC layer and a physical layer that are of a corresponding radio interface technology, that is, the SRB 1 is mapped into a MAC layer and a physical layer that are of the LTE technology. The base station may send an RRC connection setup message to the UE, and configure the frequency range into which the signaling radio bearer SRB 2 needs to be mapped. The SRB 2 is mapped into a MAC layer and a physical layer that are of a corresponding radio interface technology, that is, the SRB 2 is mapped into the MAC layer and the physical layer that are of the LTE technology.

Optionally, the RRC reconfiguration signaling indicates a radio interface technology used for the service of the UE and a frequency range corresponding to the radio interface technology. Specifically, the frequency range into which the DRB needs to be mapped and the frequency range into which the SRB 2 needs to be mapped are configured.

Newly added information elements of the RRC connection reconfiguration message include but are not limited to:

an addition/modification list information element of a radio interface technology, including: an identifier corresponding to the radio interface technology, and a type of the radio interface technology (including a characteristic combination of a multiple access mode, a frame structure, a CP length, a physical channel, and the like);

a downlink bandwidth, a start sub-band offset frequency, or a center frequency of the dedicated frequency range;

in a TDD system, further including an uplink-downlink subframe configuration of the dedicated frequency range, and the like; and a release list information element of a radio interface technology, including at least identification information corresponding to the radio interface technology.

The addition/modification list information element includes the frequency range into which the DRB needs to be mapped, and the frequency range into which the SRB needs to be mapped.

The base station and the UE may use different radio interface technologies for communication. The radio interface technologies are used for different services, and use corresponding radio resources. It can be understood that different UEs may use different radio interface technologies.

414. The base station transmits, by using a radio interface technology supported by the frequency range into which the DRB is mapped, a service carried on the service bearer DRB with the UE.

The base station transmits, by using the frequency range that is determined in step 413 and into which each DRB is mapped and the radio interface technology supported by the frequency range, the service carried on the DRB with the UE.

415. When a cell load state changes or a requirement of the service of the UE for a radio resource changes, the base station changes a bandwidth corresponding to the radio interface technology or changes the frequency range corresponding to the radio interface technology.

The base station indicates, to the UE by using a system message, RRC signaling, a MAC control element (CE), or a physical downlink control channel (PDCCH), a change of the bandwidth corresponding to the radio interface technology, or a new bandwidth and a new frequency range that are corresponding to the radio interface technology.

For example, when load of the M2M service needs a larger bandwidth, the base station increases the bandwidth used by the radio interface technology that is used for the M2M service, and reconfigures a bandwidth corresponding to each radio interface technology.

Frequency ranges corresponding to different radio interface technologies are changed. For example, if a wireless status of most UEs that use the ultra-low latency M2M service is better in another frequency range, the base station informs, in the foregoing manner, changes of the frequency ranges corresponding to the different radio interface technologies.

Changing a frequency range corresponding to a radio interface technology further includes adding or deleting the radio interface technology and the frequency range corresponding to the radio interface technology. The UE may be informed by using RRC signaling or system information.

According to the foregoing steps, persons skilled in the art easily understand that the correspondence between the radio interface technology and the frequency range can be flexibly changed.

Embodiment 5

Embodiment 5 of the present disclosure provides another implementation of a method for using a radio interface technology. The method for using a radio interface technology includes allocation of frequency band resources of a cell, a method for indicating a frequency range corresponding to a radio interface technology, a process in which UE accesses a system, and a process of mapping between a radio bearer of the UE, a radio interface technology, and a frequency range.

In Embodiment 5, a whole frequency band of a cell is divided into two frequency ranges. However, a manner for configuring a common frequency range in this embodiment is different from that in Embodiment 4. In this embodiment, the two frequency ranges are both dedicated frequency ranges, and support different radio interface technologies. In addition, a common frequency range covers the whole frequency band of the cell.

The implementation method in Embodiment 5 may include the following steps.

A base station divides a whole frequency range of a cell into two dedicated frequency ranges. A different radio interface technology is used for each frequency range. A radio interface technology used for one frequency range is an existing LTE technology, and is used for transmitting a mobile broadband unicast service. A radio interface technology used for the other frequency range is used for transmitting an ultra-low latency M2M service, uses a frame structure different from that used in the existing LTE technology, and optionally further uses a different multiple access technology, for example, SCMA. In this embodiment, the common frequency range occupies the whole frequency band of the cell, and an LTE radio interface technology is used. The common frequency range carries a common channel of the cell. The common channel includes a synchronization channel, a cell-specific reference signal, a broadcast channel, a paging channel, and a random access channel.

Persons skilled in the art can understand that the common frequency range and a dedicated frequency resource in this embodiment overlap with each other in a frequency domain; therefore, the common channel of the cell is also mapped into the dedicated frequency range. However, the common channel is separate, in other dimensions such as a time frequency, from a DRB carried in the dedicated frequency range.

System information of the common frequency range is system information that is broadcast on a total cell bandwidth, and may include the following content:

a master information block (MIB) of the common frequency range, including: a system frame number (SFN) of the cell; and a total downlink bandwidth of the cell;

newly added information elements of a system information block 1 (SIB 1) of the common frequency range, including but not limited to: an identifier corresponding to a radio interface technology used for the current cell; frequency band information of the dedicated frequency range; a characteristic of a radio interface technology supported by the dedicated frequency range, including a type that is of the radio interface technology and that includes a characteristic combination of a multiple access mode, a frame structure, a CP length, a physical channel, and the like; in a TDD system, further including an uplink-downlink subframe configuration of the dedicated frequency range; and a downlink bandwidth, a start sub-band offset frequency, or a center frequency of the dedicated frequency range; and a system information block 2 (SIB 2) of the common frequency range, including but not limited to: a RACH resource configuration for the radio interface technology supported by the common frequency range; in a frequency division multiplexing (FDD) system, including an uplink bandwidth; and physical resource configuration information specific to the radio interface technology supported by the dedicated frequency range, such as SCMA-related configuration information, where in the FDD system, an uplink bandwidth, included in the system information block 2, used by each radio interface technology may be different from a downlink bandwidth.

The base station sends a random access channel RACH of the cell to a user by using a system broadcast message. In this embodiment, the base station broadcasts RACH information by using the system information of the common frequency range. The random access resource may be located within the whole frequency band of the cell.

The UE obtains frequency band information of the common frequency range and the frequency band information of the dedicated frequency range, a correspondence between the dedicated frequency range and the radio interface technology, or characteristic information of the radio interface technology, and RACH resource configuration information of the cell by using the system information of the common frequency range. The RACH resource configuration information includes a RACH time-frequency resource and RACH common resource configuration information. The UE selects a RACH resource from the received RACH resource configuration, and implements a random access process according to the RACH resource selected by the UE.

Steps of performing random access and establishing a DRB by the UE are consistent with those in Embodiment 4. Details are not described herein again.

It should be noted that, if the UE initially accesses a network, the base station first needs to establish an SRB for the UE before establishing the DRB for the UE, map the signaling bearer SRB of the UE into a specified frequency range, and transmit Radio Resource Control RRC signaling with the UE by using a radio interface technology supported by the specified frequency range. In this embodiment, the specified frequency range is the common frequency range, and occupies the whole frequency band of the cell in the frequency domain; or may be the dedicated frequency range.

The base station sends first indication information such as RRC signaling to the UE, where the first indication information is used to indicate, to the UE, the frequency range into which the SRB needs to be mapped.

Embodiment 6

Figure 5:
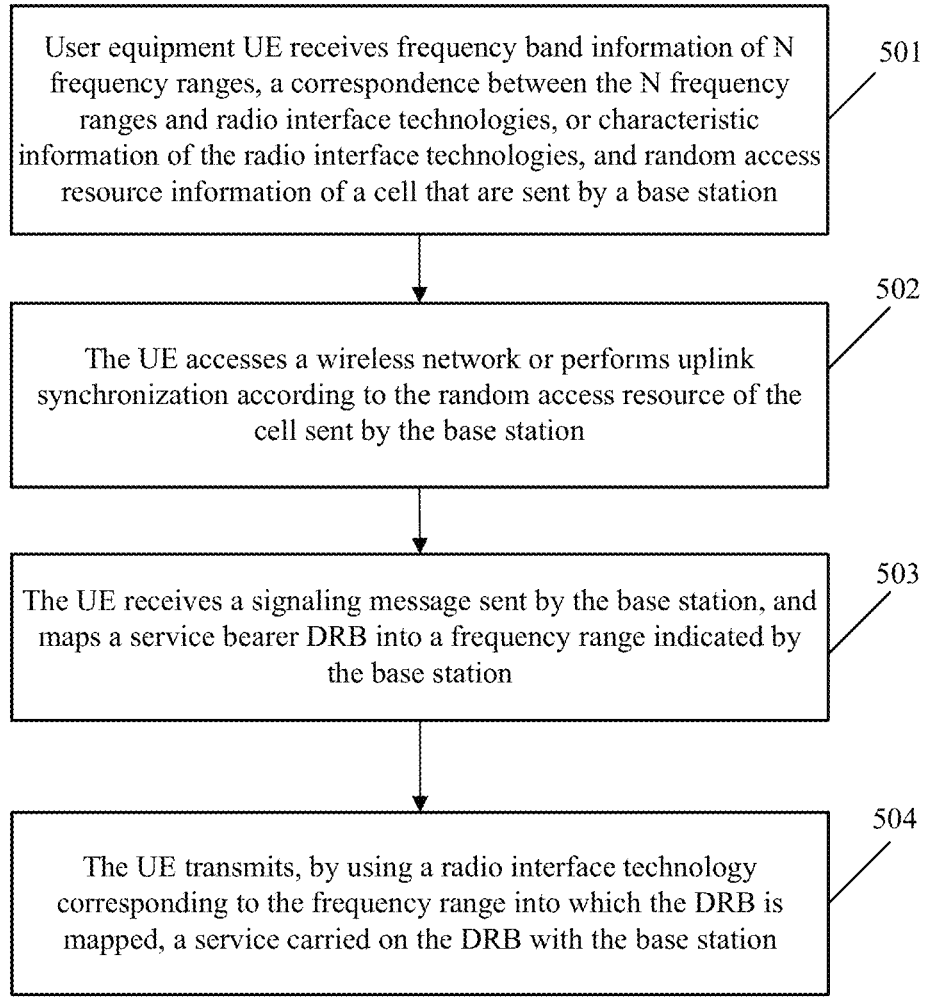
FIG. 5 is a flowchart of a method for using a radio interface technology according to an embodiment of the present disclosure.

Embodiment 6 provides an access method, implemented on a terminal side, for using a radio interface technology, so as to cooperate with a base station side in implementing the method for using a radio interface technology. As shown in FIG. 5, the base station divides a frequency band of a cell into N frequency ranges, where each of the N frequency ranges supports one radio interface technology, N is an integer, and N≥2. A process in which a terminal device accesses a wireless network is as follows.

501. User equipment UE receives frequency band information of the N frequency ranges, a correspondence between the N frequency ranges and radio interface technologies, or characteristic information of the radio interface technology, and random access resource information of the cell that are sent by the base station.

When network planning is performed for a system, a whole frequency band of a cell may be divided into N frequency ranges. One radio interface technology is used for each frequency range of the N frequency ranges, and the cell supports at least two different radio interface technologies. The base station establishes a correspondence between each of the frequency ranges and the radio interface technology according to a network planning result. Then, the base station sends the frequency band information of the frequency ranges that are obtained by means of division, the correspondence between the frequency ranges and the radio interface technologies, or the characteristic information of the radio interface technology to the UE.

The frequency range planned for the system includes a common frequency range and a dedicated frequency range, or includes only a dedicated frequency range.

The common frequency range is a frequency range shared by radio interface technologies, and includes a radio resource corresponding to a common channel and an SRB. The common channel includes a synchronization channel, a cell-specific reference signal, a broadcast channel, a paging channel, or a random access channel.

All users in the cell may complete, by using the common frequency range, a process related to initial network access.

After powering on UE, a user may use the synchronization channel of the common frequency range to perform system synchronization and keep system synchronization. After system synchronization is performed, the user may obtain a system broadcast of the cell from a system broadcast message of the common frequency range. The system broadcast message includes all common information of the cell. For example, the system broadcast message of the common frequency range includes frequency band information of the dedicated frequency range in addition to a bandwidth of a frequency band of the common frequency range. Therefore, the user may learn the frequency band information of the dedicated frequency range of the cell by using the system broadcast message of the common frequency range. The frequency band information includes a bandwidth and a center frequency of the dedicated frequency range. The system broadcast message of the common frequency range includes a correspondence between the common frequency range and the radio interface technology and a correspondence between the dedicated frequency range and the radio interface technology, and includes the random access channel of the common frequency range and a random access channel of the dedicated frequency range. The system information of the common frequency range may further include related characteristic information of the radio interface technology supported by the dedicated frequency range. The system broadcast message of the common frequency range may alternatively include only cell information related to the common frequency range, for example, include only frequency band information of the common frequency range, a correspondence between the common frequency range and the radio interface technology, and the random access channel of the common frequency range. If the system broadcast information of the common frequency range does not include frequency band information of the dedicated frequency range or related characteristic information of the radio interface technology supported by the dedicated frequency range, after the UE successfully accesses the network by using the common frequency range, the base station may configure the frequency band information of the dedicated frequency range for the UE by using RRC signaling.

The user may receive the frequency band information, sent by the base station, of the frequency ranges in either of the following two manners:

reading, by the user, the system broadcast message or the RRC control signaling, sent by the base station, of the common frequency range, where the system broadcast message or the RRC control signaling of the common frequency range includes the frequency band information of the common frequency range and the frequency band information of the dedicated frequency range; or reading, by the user, a system broadcast message or RRC control signaling, sent by the base station, of the dedicated frequency range, where the system broadcast message or the RRC control signaling of the dedicated frequency range includes the frequency band information of the dedicated frequency range.

The user may further receive a system paging message by using the paging channel of the common frequency range.

After reading system broadcast information of the cell, the user may access the wireless network by using the random access channel of the common frequency range, or may access the wireless network by using the random access channel of the dedicated frequency range. When the user accesses the network, the base station establishes a signaling bearer of the user in the common frequency range of the cell, and transmits an RRC signaling message between the base station and the user by using the common frequency range. If the signaling bearer of the user has been established, the base station does not need to establish a signaling bearer for the UE.

The dedicated frequency range is a frequency range used by each radio interface technology individually, carries a radio resource used for service transmission, and is responsible for transmitting a specific service. After the user completes initial access in the common frequency range, when the network or the user initiates a service, the base station establishes, in the dedicated frequency range, a data radio bearer DRB that carries service transmission.

It should be noted that the common frequency range may specially carry the common channel and the SRB, and may also transmit a specific service as the dedicated frequency range does. Such a common frequency range carries all of the common channel, the SRB, and the DRB.

Before reading the system broadcast message, the UE may complete system synchronization and keep system synchronization by using the synchronization channel of the common frequency range. Alternatively, when the base station sends a synchronization signal and a reference signal in the dedicated frequency range, the UE completes initial system synchronization by using the synchronization channel of the common frequency range, and then keeps system synchronization by using the synchronization channel or the reference signal of the dedicated frequency range. However, if there is no common frequency range, before reading the system broadcast message of the dedicated frequency range, the UE completes system synchronization and keeps system synchronization by using the synchronization channel of the dedicated frequency range.

In addition, if the system has no common frequency range, the dedicated frequency range further carries a common channel and an SRB. The common channel includes a synchronization channel, a cell-specific reference signal, a broadcast channel, a paging channel, or a random access channel. The user may use the synchronization channel of the dedicated frequency range, to perform system synchronization and keep system synchronization. The user obtains the common information of the cell by using system information of the dedicated frequency range. However, the dedicated frequency range can broadcast only common information, related to the dedicated frequency range, of the cell, such as the frequency band information of the dedicated frequency range, the correspondence between the dedicated frequency range and the radio interface technology, or the random access channel of the dedicated frequency range. The user listens to a paging message, sent by the base station, of the dedicated frequency range, and completes initial random access on the random access channel of the dedicated frequency range. When the user performs initial network access, the user may select, according to a type of a service to be initiated, a dedicated frequency range for use, and complete initial network access in the dedicated frequency range. In addition, when the user accesses the network, the base station may further establish an SRB in the dedicated frequency range.

The base station sends a random access channel RACH of the cell to the user by using a system broadcast message. The base station may broadcast RACH information by using the system information of the common frequency range. The random access resource may be located in the common frequency range, or may be located in the dedicated frequency range. Alternatively, the base station may broadcast RACH information by using the system information of the dedicated frequency range. The random access resource is located in the dedicated frequency range, that is, a RACH resource that is read by the UE from the system information of the dedicated frequency range is located in the dedicated frequency range.

502. The UE accesses a wireless network or performs uplink synchronization according to the random access resource of the cell sent by the base station.

The UE selects a random access channel according to the RACH resource information in the system broadcast of the base station.

If the UE initially accesses the network, the UE performs network access by using the selected random access channel. If it is not the first time for the UE to access the network, the UE may perform uplink synchronization by using the selected random access channel.

503. The UE receives indication information sent by the base station, where the indication information is used to indicate a frequency range into which a DRB of the UE needs to be mapped.

After the UE accesses the network and when a service is initiated, the base station maps the service bearer DRB of the UE into a frequency range specified by the base station, and transmits the service with the UE by using a radio interface technology supported by specified the frequency range.

After the UE accesses the network, service transmission may be initiated. Service transmission may be initiated by the network or may be initiated by the UE. A mapping relationship between a DRB used for transmitting a service and a radio interface technology needs to be determined, and is used by the base station to transmit the service with the UE. The mapping relationship between the DRB and the radio interface technology is established by the base station. The base station sends the mapping relationship to the UE.

The base station obtains, according to a service request initiated by the UE, a type of a service that initiates the request, and establishes a mapping relationship between the service and a frequency range according to the service type. Because the mapping relationship between each frequency range and the radio interface technology is determined by the base station, a correspondence between the service and the radio interface technology may be determined, and a mapping relationship between the DRB on which the service is carried and the radio interface technology may also be determined. The DRB may be mapped into the dedicated frequency range, or may be mapped into the common frequency range. The base station may determine the correspondence between the service and the radio interface technology when the UE initiates the service request, or may have determined the correspondence between the service and the radio interface technology before the UE initiates the service request.

The base station informs, by using the indication information such as RRC signaling, the UE of the frequency range into which the DRB needs to be mapped, where the DRB is used to carry the service. Then, the UE learns, according to the radio interface technology supported by the frequency range that is previously learnt, the radio interface technology used by the DRB.

It should be noted that, if the UE initially accesses the network, the base station needs to establish an SRB for the UE before establishing the DRB for the UE, and establish a mapping relationship between the SRB of the UE and a frequency range. Because the mapping relationship between each frequency range and the radio interface technology is determined by the base station in the foregoing step, a correspondence between the SRB of the UE and the radio interface technology may also be determined.

The UE maps the signaling radio bearer SRB of the UE into the specified frequency range according to the indication of the base station, and transmits Radio Resource Control RRC signaling with the base station by using the radio interface technology supported by the frequency range. The RRC signaling is used to establish the service bearer of the UE.

When the system broadcast message read by the UE is the system broadcast information of the common frequency range, the UE accesses the wireless network by using the common frequency range, and the base station may map the SRB of the UE into the common frequency range or the dedicated frequency range. If the frequency ranges of the cell include only a dedicated frequency range and exclude a common frequency range, the system broadcast information read by the UE is the system broadcast information of the dedicated frequency range. The dedicated frequency range includes a common channel and a signaling bearer resource. The UE accesses the wireless network by using the dedicated frequency range, and the base station maps the SRB of the UE into the corresponding dedicated frequency range. As described in the foregoing steps, it can be understood that, in this case, the UE selects a corresponding dedicated frequency range according to the type of the service to be initiated, and accesses the network. Therefore, the base station maps the SRB of the UE into the dedicated frequency range selected by the UE. The common channel includes a synchronization channel, a cell-specific reference signal, a broadcast channel, a paging channel, or a random access channel.

The base station informs, by using an RRC signaling message, the UE of the frequency range into which the SRB of the UE needs to be mapped, or informs the UE of the frequency range into which the SRB needs to be mapped and a frequency range into which at least one of the DRB of the UE needs to be mapped. After receiving the RRC signaling, the UE maps the signaling radio bearer SRB of the UE into the specified frequency range, and transmits the Radio Resource Control RRC signaling with the base station by using the radio interface technology supported by the frequency range.

The mapping the SRB of the UE into the frequency range includes: using, by the SRB, a physical layer resource of the frequency range; or using, by the SRB, a physical layer resource of the frequency range and a Media Access Control MAC layer entity corresponding to the frequency range.

504. The UE maps the DRB of the UE into the frequency range into which the DRB needs to be mapped.

The mapping, by the UE, the DRB into the specified frequency range includes: using, by the DRB, a physical layer resource of the frequency range; or using, by the DRB, a physical layer resource of the frequency range and a Media Access Control MAC layer entity corresponding to the frequency range.

505. The UE transmits, by using a radio interface technology supported by the frequency range into which the DRB is mapped, a service carried on the service bearer DRB with the base station.

The UE transmits, by using the frequency range that is determined in step 503 and into which each DRB is mapped and the radio interface technology supported by the frequency range, the service carried on the DRB with the base station.

It can be learnt that, according to the method for using a radio interface technology in Embodiment 6 of the present disclosure, a frequency range used by each radio interface technology may be planned within a whole frequency range of a cell, and resources that are used by a common channel, a signaling radio bearer, and a service bearer may be planned in a frequency domain, so that flexibility of radio resource configuration is improved, thereby improving radio resource utilization.

Embodiment 7

Embodiment 7 provides a specific implementation of an access method, implemented on a terminal side, for using a radio interface technology, so as to cooperate with a base station side in implementing the method, provided in the present disclosure, for using a radio interface technology.

Figure 6A:
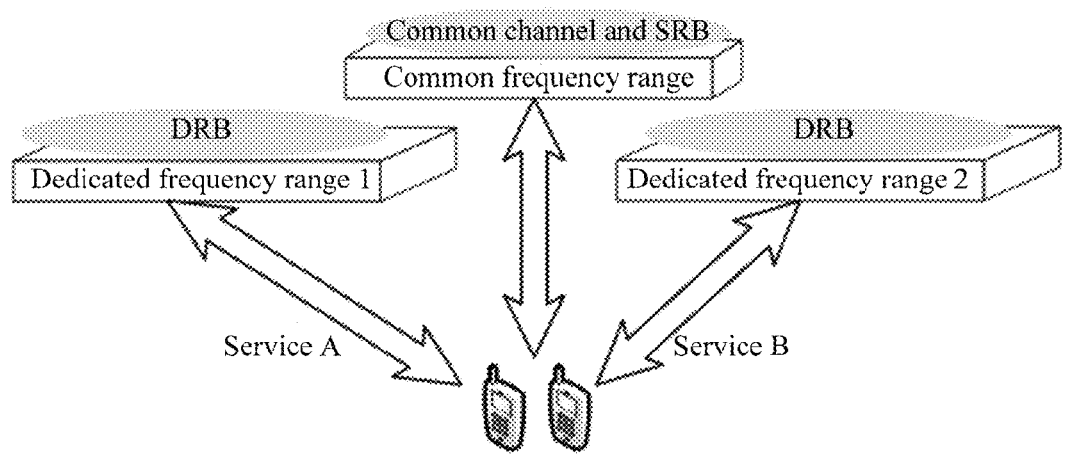
FIG. 6A is a schematic diagram illustrating that UE accesses a wireless network according to an embodiment of the present disclosure.

FIG. 6A is a schematic diagram illustrating that a terminal accesses a wireless network according to Embodiment 7 of the present disclosure. A common channel and an SRB are mapped into a common frequency range, the UE accesses the wireless network by using the common frequency range, a DRB is mapped into a dedicated frequency range, and the UE transmits a service by using the dedicated frequency range. A service A is transmitted by using a dedicated frequency range 1, and a service B is transmitted by using a dedicated frequency range 2.

When network planning is performed for a system, a whole frequency band of a cell is divided into N frequency ranges, and it is specified that a different radio interface technology is used for each of the frequency ranges. In this embodiment, the whole frequency range of the cell is divided into two frequency ranges, and two different radio interface technologies are used. One radio interface technology is an existing LTE technology, is corresponding to the common frequency range, and is used for transmitting the common channel and a mobile broadband unicast service bearer. The other radio interface technology uses a frame structure different from that used in the existing LTE technology. Optionally, the other radio interface technology may further use a different multiple access technology such as SCMA, is corresponding to the dedicated frequency range, and is used for transmitting an ultra-low latency M2M service bearer. In Embodiment 7, a radio interface technology supported by the common frequency range is an LTE radio interface technology. The LTE radio interface technology carries a DRB of a mobile broadband unicast service, and the mobile broadband unicast service uses a radio resource, a MAC entity, and a physical layer (PHY) entity that are used by the LTE technology. Correspondingly, the dedicated frequency range uses a radio interface technology that uses a frame structure different from that used in the LTE technology. The radio interface technology carries a DRB of an ultra-low latency M2M service, and the DRB of the ultra-low latency M2M service uses a radio resource, a MAC entity, and a physical layer (PHY) entity that are used by the radio interface technology that uses a frame structure different from that used in the LTE technology.

In Embodiment 7, all UEs detect the common channel such as a synchronization channel (SCH) and a broadcast channel BCH in the common frequency range, and access the system according to a random access resource indicated by a system message. The random access resource is located in the common frequency range or the dedicated frequency range, or located in both the common frequency range and the dedicated frequency range. The UEs may select different random access resources, and access the wireless network; or may access the wireless network according to the random access resource indicated by the base station.

Figure 6B:
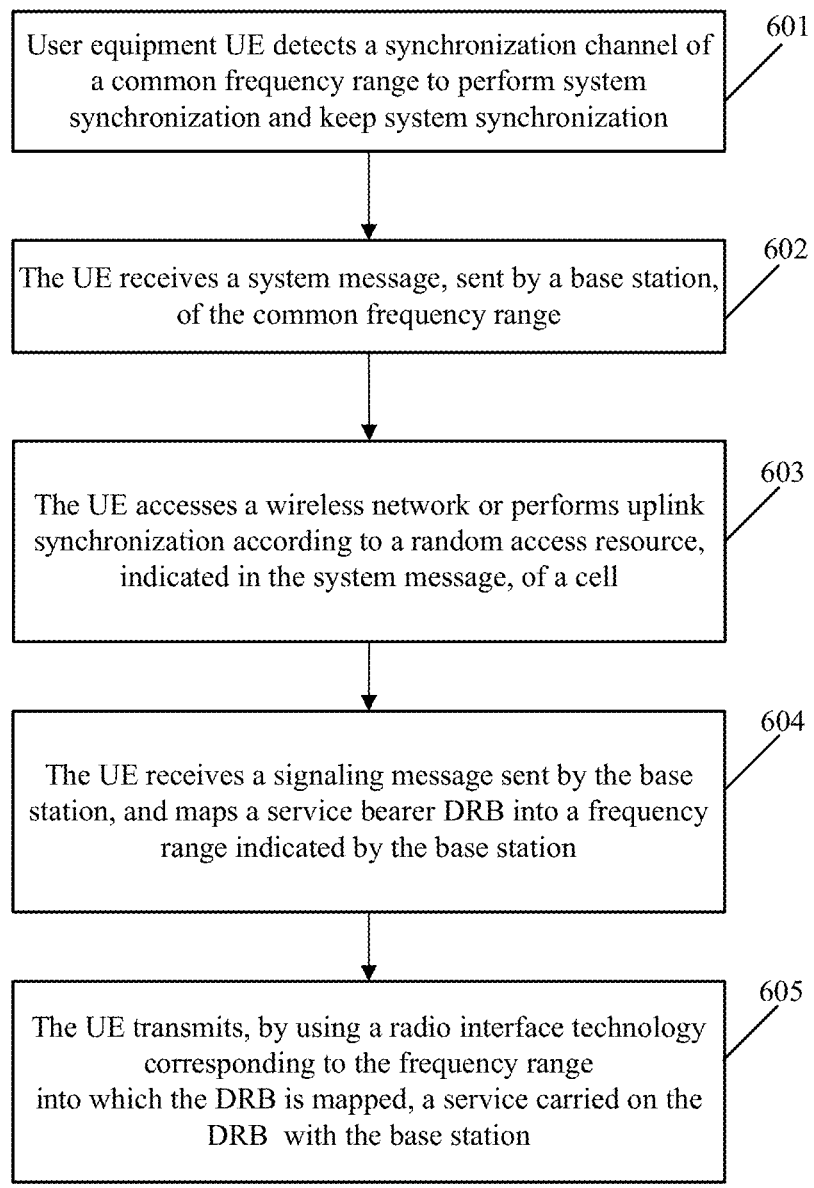
FIG. 6B is a flowchart illustrating that UE accesses a wireless network according to an embodiment of the present disclosure.

As shown in FIG. 6B, the implementation method in this embodiment may include the following steps.

601. User equipment UE detects a synchronization channel of a common frequency range to perform system synchronization and keep system synchronization.

The UE detects the synchronization channel at a frequency channel of the common frequency range according to the stored frequency channel of the common frequency range, obtains synchronization channel information in a synchronization channel detection manner of the existing LTE technology, and performs downlink synchronization with the base station.

When a reference signal used for fine synchronization or a synchronization channel is also provided for a radio interface technology corresponding to a dedicated frequency range, the UE may obtain frequency band information of the dedicated frequency range from a system broadcast message that is read from the common frequency range, and obtain, by using a synchronization channel detection manner of the radio interface technology used for the dedicated frequency range, synchronization channel information of the radio interface technology used for the dedicated frequency range. Therefore, alternatively, the UE may first perform synchronization successfully by using the synchronization channel of the common frequency range, read the system broadcast message, and then keep system synchronization by using the synchronization channel or the reference signal used by the radio interface technology corresponding to the dedicated frequency range.

602. The UE obtains frequency band information of two frequency ranges of a cell, a correspondence between the frequency ranges and radio interface technologies, characteristic information of the radio interface technology, and random access resource information of the cell by using a system message, sent by the base station, of the common frequency range, where the random access resource information is used to instruct the UE to access the cell or instruct the UE to perform uplink synchronization with the cell.

The base station divides a whole frequency band of a cell into two frequency ranges, and specifies that a different radio interface technology is used for each of the frequency ranges. One radio interface technology is an existing LTE technology, is corresponding to the common frequency range, and is used for transmitting a common channel and a mobile broadband unicast service on a user plane. The other radio interface technology uses an interface technology different from the existing LTE technology, is corresponding to the dedicated frequency range, and is used for transmitting an ultra-low latency M2M service bearer. The base station establishes a correspondence between each of the frequency ranges and the radio interface technology according to a network planning result. In this embodiment, the base station sends, to the UE by using the system broadcast message of the common frequency range, the frequency band information of the two frequency bands that are obtained by means of division, and sends a correspondence between the common frequency range and the existing LTE technology and a correspondence between the dedicated frequency range and the radio interface technology different from the existing LTE technology to the UE.

Embodiment 7 provides an example of system message content broadcast in the common frequency range. The base station informs, by using the broadcast message of the common frequency range, the UE of the correspondence between each frequency range and the radio interface technology, and the characteristic information of the radio interface technology supported by the dedicated frequency range. The characteristic information of the radio interface technology includes a type that is of the radio interface technology and that includes a characteristic combination of a multiple access mode, a frame structure, a CP length, a physical channel, and the like; an uplink-downlink subframe configuration; and physical channel resource configuration information specific to a radio interface. System information of the common frequency range includes:

a master information block (MIB) of the common frequency range, including: an SFN of the common frequency range; an SFN that is the same as that used for the dedicated frequency range or that has an integer multiple relationship with the SFN of the common frequency range; and a bandwidth of the common frequency range;

newly added information elements of a system information block 1 (SIB 1) of the common frequency range, including: an identifier of the radio interface technology supported by the common frequency range; a downlink bandwidth, a start sub-band offset frequency, or a center frequency of the dedicated frequency range; an identifier of the radio interface technology supported by the dedicated frequency range; a type that is of the radio interface technology and that includes a characteristic combination of a multiple access mode, a frame structure, a CP length, a physical channel, and the like; and in a TDD system, further including an uplink-downlink subframe configuration of the dedicated frequency range; and a system information block 2 (SIB 2) of the common frequency range, including but not limited to: a PRACH resource configuration for the radio interface technology supported by the common frequency range; in a frequency division multiplexing (FDD) system, including an uplink bandwidth; and physical layer resource configuration information specific to a radio interface, such as SCMA-related configuration information, where in the FDD system, an uplink bandwidth, included in the system information block 2, used by each radio interface technology may be different from a downlink bandwidth.

After the base station informs the UE of the correspondence between each frequency range and the radio interface technology or the characteristic information of the radio interface technology, the UE may select a corresponding frequency range according to a type of a service to be initiated, and complete a wireless network access process.

After obtaining, by using the system broadcast message that is of the common frequency range and that is sent by the base station, the correspondence between each frequency range and the radio interface technology, and the characteristic information of the radio interface technology supported by the dedicated frequency range, the UE may select the corresponding frequency range according to the type of the service to be initiated, and complete the wireless network access process. In this embodiment, the UE always selects the common frequency range to implement the wireless network access process.

When the system information changes, the base station informs the UE of a change of the system information by sending a paging message in the common frequency range. The UE is periodically tuned in to the common frequency range according to a periodic configuration of the system message, and reads the system information. Alternatively, the UE is tuned in to the common frequency range only during paging, to read the paging message; and after receiving a notification of the change of the system information, reads an updated system message in a period during which the system information is effective.

In Embodiment 7, the base station broadcasts RACH information by using the system information of the common frequency range. The random access resource may be located in the common frequency range, or may be located in the dedicated frequency range.

A RACH resource in each frequency range is configured according to the characteristic of the radio interface technology supported by each frequency range. Specifically, a RACH channel format, a random access preamble, and the like are configured according to the characteristic of the radio interface technology supported by each frequency range. For example, in this embodiment, a RACH resource in the dedicated frequency range is configured according to a frame structure used by the radio interface technology for ultra-low latency M2M.

603. The UE accesses a wireless network or performs uplink synchronization according to the random access resource of the cell sent by the base station.

The UE selects a random access channel according to RACH resource configuration information of the cell. The RACH resource configuration information of the cell is obtained from the system message, read by the UE, of the common frequency range.

The UE obtains the RACH resource configuration information from the system information of the common frequency range. The RACH resource configuration information includes a RACH channel time-frequency resource and RACH common resource configuration information. The RACH resource configuration may be located in the common frequency range and/or the dedicated frequency range. The UE implements a random access process according to a random access resource selected by the UE.

As described above, the RACH resource of the system may be located in the common frequency range, or may be located in the dedicated frequency range. Therefore, the UE may select a RACH channel of the common frequency range to implement an initial random access process, or may implement an initial random access process by using a RACH channel of the dedicated frequency range. If the UE initially accesses the network, the UE performs network access by using the selected random access channel. If it is not the first time for the UE to access the network, the UE may perform uplink synchronization by using the selected random access channel.

604. The UE receives indication information sent by the base station, where the indication information is used to indicate a frequency range into which a data radio bearer DRB of the UE needs to be mapped.

In this embodiment, the base station may send an RRC connection reconfiguration message to the UE, and configure the frequency range into which the DRB needs to be mapped, as described in Embodiments 4 and 5. The UE maps a DRB of an ultra-low latency M2M service into the frequency range corresponding to ultra-low latency M2M, and maps a DRB of a mobile broadband unicast service into the frequency range corresponding to the LTE technology.

If the UE initially accesses the network, the base station first establishes an SRB for the UE before establishing the DRB for the UE. The UE maps, according to the indication of the base station, the signaling radio bearer SRB of the UE into a frequency range specified by the base station, and transmits Radio Resource Control RRC signaling with the base station by using a radio interface technology supported by the frequency range.

605. The UE maps the DRB of the UE into the frequency range into which the DRB needs to be mapped.

606. The UE transmits, by using a radio interface technology supported by the frequency range into which the DRB is mapped, a service carried on the service bearer DRB with the base station.

The UE transmits, by using the frequency range that is determined in step 604 and into which each DRB is mapped and the radio interface technology supported by the frequency range, the service carried on the DRB with the base station.

Embodiment 8

Embodiment 8 provides another specific implementation of an access method, implemented on a terminal side, for using a radio interface technology, so as to cooperate with a base station side in implementing the method, provided in the present disclosure, for using a radio interface technology.

Figure 7A:
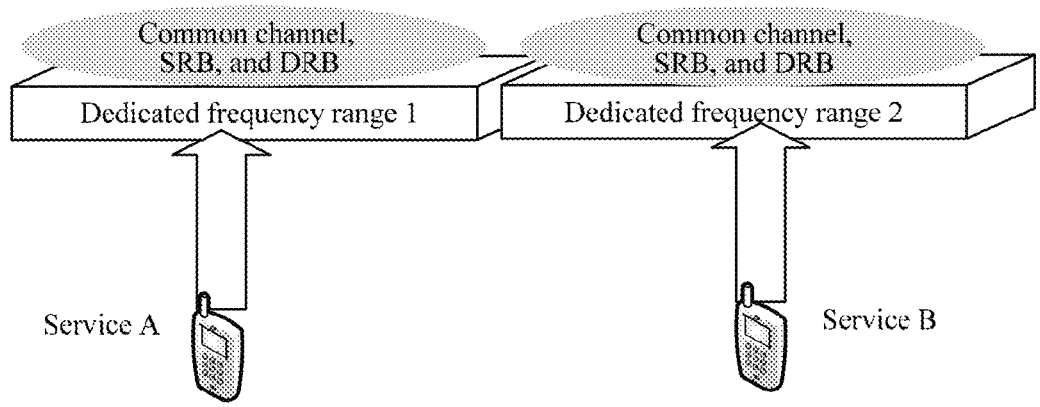
FIG. 7A is another schematic diagram illustrating that UE accesses a wireless network according to an embodiment of the present disclosure.

FIG. 7A is another schematic diagram illustrating that a terminal accesses a wireless network. A common channel, an SRB, and a DRB that are corresponding to each radio interface technology are mapped into a dedicated frequency range corresponding to each radio interface technology. When initiating a service, UE accesses the wireless network by using a dedicated frequency range corresponding to the service. When initiating a service A, the UE accesses the wireless network by using a dedicated frequency range 1. When initiating a service B, the UE accesses the wireless network by using a dedicated frequency range 2.

When network planning is performed for a system, a whole frequency band of a cell is divided into multiple frequency ranges, and it is specified that a different radio interface technology is used for each of the frequency ranges. Optionally, the whole frequency range of the cell is divided into two dedicated frequency ranges, and two different radio interface technologies are used.

In Embodiment 8, an LTE radio interface technology carries an SRB and a DRB that are used for transmitting a mobile broadband unicast service, and uses a radio resource, a MAC entity, and a physical layer (PHY) entity that are used by an LTE technology. A radio interface technology that uses a frame structure different from that used in the LTE technology carries an SRB and a DRB that are used for an ultra-low latency M2M service, and uses a radio resource, a MAC entity, and a physical layer (PHY) entity that are used by the radio interface technology that uses a frame structure different from that used in the LTE technology.

In Embodiment 8, the UE detects a common channel such as a synchronization channel (SCH) and a system broadcast message in one dedicated frequency range of the two frequency ranges of the cell, and accesses the system according to a RACH resource indicated by the system broadcast message of the dedicated frequency range. The RACH resource is located in the dedicated frequency range. The UE may select one of the RACH resource, and accesses the wireless network; or may access the wireless network according to a random access resource indicated by the base station.

Figure 7B:
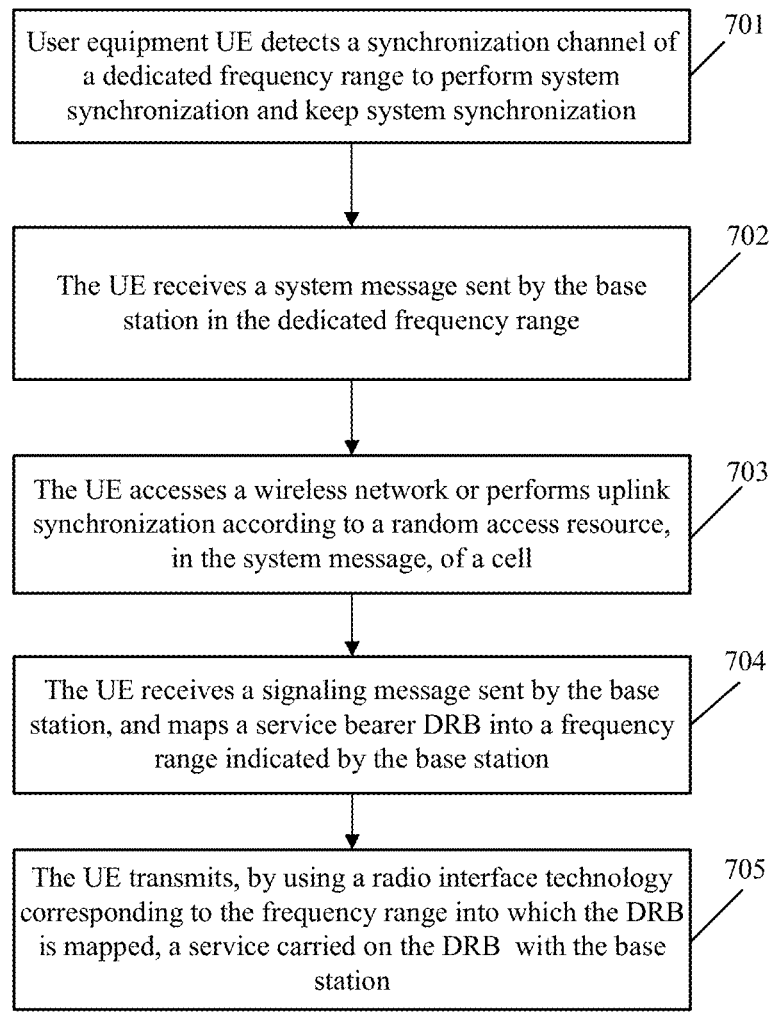
FIG. 7B is another flowchart illustrating that UE accesses a wireless network according to an embodiment of the present disclosure.

As shown in FIG. 7B, the implementation method provided in this embodiment may include the following steps.

701. User equipment UE detects a synchronization channel of a dedicated frequency range to perform system synchronization and keep system synchronization.

The UE detects synchronization channels at center frequencies of dedicated frequency ranges according to the stored center frequencies of the two dedicated frequency ranges.

Optionally, the UE obtains synchronization channel information in a synchronization channel detection manner of the existing LTE technology, or obtains synchronization channel information in a synchronization channel detection manner of the radio interface technology that uses a frame structure different from that used in the existing LTE technology, to perform downlink synchronization with the base station.

702. The UE receives a system message sent by a base station in the dedicated frequency range, and obtains frequency band information of the dedicated frequency range, a correspondence between the dedicated frequency range and a radio interface technology, characteristic information of the radio interface technology, and random access channel RACH resource information of a cell.

The base station divides a whole frequency band of a cell into two frequency ranges, and a radio interface technology is used for each of the frequency ranges. One radio interface technology is an existing LTE technology, is corresponding to a common frequency range, and is used for transmitting a common channel, a signaling radio bearer, and a mobile broadband unicast service on a user plane. The other radio interface technology uses an interface technology different from the existing LTE technology, is corresponding to the dedicated frequency range, and is used for transmitting an ultra-low latency M2M service bearer.

Optionally, the base station respectively sends, to the UE by using system broadcast messages of the corresponding dedicated frequency ranges of the two frequency ranges, frequency band information of the two frequency bands that are obtained by means of division, and sends a correspondence between the dedicated frequency range and the radio interface technology that uses a frame structure different from that used in the existing LTE technology to the UE.

For example, the base station informs the UE of the correspondence between the dedicated frequency range and the radio interface technology, and the characteristic information of the radio interface technology by using the broadcast message of the dedicated frequency range. The characteristic of the radio interface technology includes a type that is of the radio interface technology and that includes a characteristic combination of a multiple access mode, a frame structure, a CP length, a physical channel, and the like; an uplink-downlink subframe configuration; and physical channel resource configuration information specific to a radio interface.

After obtaining, by using the system broadcast message that is of the dedicated frequency range and that is sent by the base station, the correspondence between the dedicated frequency range and the radio interface technology, or the characteristic information of the radio interface technology, the UE may select a corresponding frequency range according to a type of a service to be initiated, and complete a wireless network access process. A relationship between a type of a service to be initiated and a selected frequency range is information known to the UE.

The UE separately obtains RACH configuration information from system information of the two frequency ranges. The RACH resource configuration information of the cell is obtained from the system message, read by the UE, of the dedicated frequency range.

Persons skilled in the art can understand that a RACH channel format and a random access preamble that are in a frequency range corresponding to a radio interface technology are configured according to characteristics of different radio interface technologies. For example, a RACH resource in a frequency range corresponding to an ultra-low latency M2M service is configured according to a frame structure used by a radio interface technology for ultra-low latency M2M.

In Embodiment 8, the base station broadcasts RACH information by using the system information of the dedicated frequency range. The RACH resource is located in the dedicated frequency range. The UE separately obtains the RACH resource configuration information of the dedicated frequency range by using the system information of the two dedicated frequency ranges. The RACH resource configuration information includes a RACH channel time-frequency resource and RACH common resource configuration information.

703. The UE accesses a wireless network or performs uplink synchronization according to the random access resource of the cell sent by the base station.

The UE selects, according to the type of the service to be initiated, a dedicated frequency range for random access, selects a RACH channel from the RACH resource configuration that is obtained from the system broadcast message of the dedicated frequency range, and implements a random access process. If the UE initially accesses the network, the UE performs network access by using the selected random access channel. If it is not the first time for the UE to access the network, the UE may perform uplink synchronization by using the selected random access channel.

For example, if the UE initiates a mobile broadband unicast service, the frequency range selected by the UE for random access is the dedicated frequency range corresponding to the LTE technology; the UE selects a RACH channel from the RACH resource in the frequency range corresponding to the LTE radio interface technology, and performs random access. If the UE initiates an ultra-low latency M2M service, the frequency range selected by the UE for random access is the dedicated frequency range corresponding to the interface technology different from the existing LTE technology; the UE selects a RACH channel from the RACH resource in the frequency range corresponding to the interface technology different from the existing LTE technology, and performs random access.

704. The UE receives indication information sent by the base station, where the indication information is used to indicate a frequency range into which a data radio bearer DRB of the UE needs to be mapped.

The base station may send an RRC connection reconfiguration message to the UE, and configure the frequency range into which the DRB needs to be mapped, as described in Embodiments 4 and 5. The established DRB is mapped into a MAC layer and a physical layer that are of a radio interface technology supported by the frequency range. For example, if the DRB is mapped into the existing LTE technology, the DRB is mapped into a MAC layer and a physical layer that are of the LTE technology.

It should be noted that, if the UE initially accesses the network, the base station needs to establish an SRB for the UE before establishing the DRB for the UE, and establish a mapping relationship between the SRB of the UE and a frequency range.

During a specific implementation, the base station maps the SRB of the UE into the dedicated frequency range selected by the UE for random access. For example, if the UE performs random access in the dedicated frequency range corresponding to the existing LTE technology, the base station maps the SRB of the UE into the frequency range corresponding to the existing LTE technology. If the UE performs random access in the dedicated frequency range corresponding to the radio interface technology different from the existing LTE technology, the base station maps the SRB of the UE into the frequency range corresponding to the radio interface technology different from the existing LTE technology.

The UE maps the signaling radio bearer SRB of the UE into the specified frequency range according to the indication of the base station, and transmits Radio Resource Control RRC signaling with the base station by using the radio interface technology supported by the frequency range.

705. The UE maps the DRB of the UE into the frequency range into which the DRB needs to be mapped.

706. The UE transmits, by using a radio interface technology supported by the frequency range into which the DRB is mapped, a service carried on the service bearer DRB with the base station.

The UE transmits, by using the frequency range that is determined in step 703 and into which each DRB is mapped and the radio interface technology supported by the frequency range, the service carried on the DRB with the base station.

Embodiment 9

Embodiment 9 of the present disclosure discloses a method for using a radio interface technology. In this embodiment, an SOR controller determines a frequency range used for a service, so that a base station maps, into the frequency range that needs to be mapped, a DRB on which the service is carried.

The SOR controller completes configuration of the frequency range used for the service. The SOR controller is an independent network element device, or a logical function unit located in a network element device. It is assumed that the SOR controller is a logical function unit, which is preferably located in the base station. Optionally, the logical function unit is located in a mobility management entity (MME).

Figure 8A:
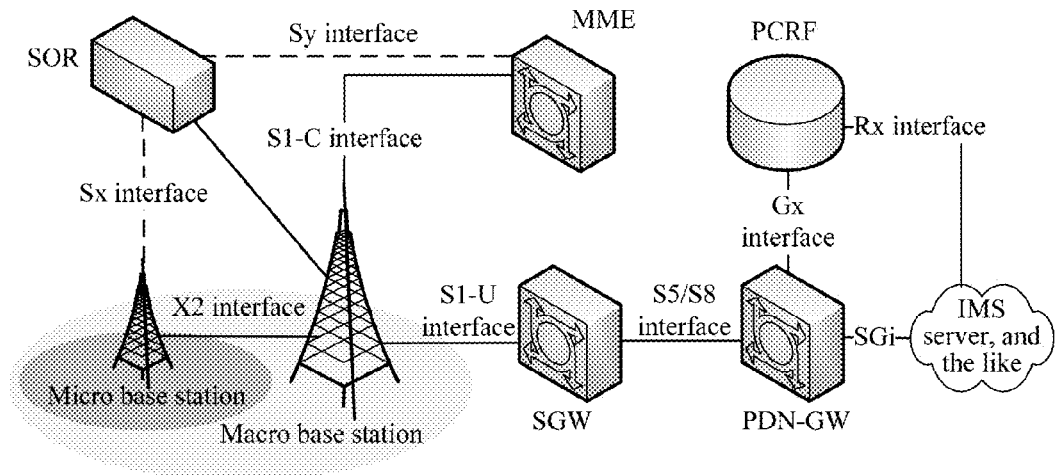
FIG. 8A is a schematic network architecture diagram according to an embodiment of the present disclosure.

To better understand a specific location of the SOR controller in a network, an LTE system is used as an example for describing a connection relationship between the SOR controller and other network elements in the LTE system. As shown in FIG. 8A, the SOR controller is connected to the base station (including a macro base station and a small cell) by using an Sx interface, and the SOR controller is connected to the MME by using an Sy interface. The Sx interface and the Sy interface are optional. If the SOR controller is located inside the base station, the Sx interface is selected; if the SOR controller is located inside the MME, the Sy interface is selected. In the figure, except the Sx interface and the Sy interface, interfaces between the other network elements are existing interfaces in the LTE system.

The SOR controller performs semi-static configuration for a service and a corresponding frequency range. For example, in a specific time period, the SOR controller keeps configurations of the service and the corresponding frequency range unchanged. The SOR controller periodically changes a mapping relationship between the service and the corresponding frequency range according to change statuses such as a service requirement, interference, and load.

Optionally, the SOR controller may perform dynamic configuration for a service and a corresponding frequency range. For example, when UE having a specific service initiates a service request, the SOR controller allocates a radio interface technology and a frequency range to the service.

Figure 8B:
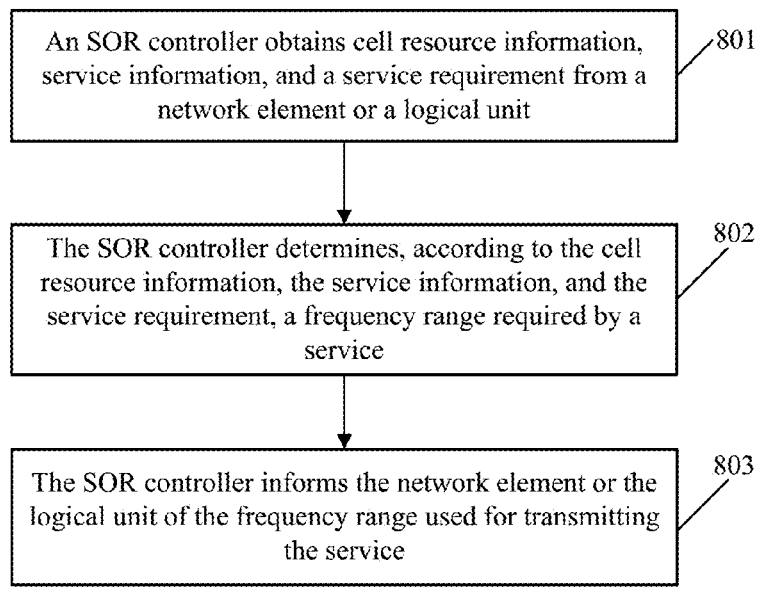
FIG. 8B is a flowchart of determining a frequency range used for a service according to an embodiment of the present disclosure.

A method, disclosed in Embodiment 9 of the present disclosure, for determining, by the SOR controller, a frequency range used for a service in the system is shown in FIG. 8B, and includes the following steps.

801. The SOR controller obtains cell resource information, service information, and a service requirement from a network element or a logical unit.

The cell resource information includes a frequency range obtained after the base station divides a frequency band of a cell, a radio interface technology supported by the frequency range, characteristic information of the radio interface technology, and the like. Different types of services include services of different quality of service (QoS) or services of different technology characteristics. The services of different technology characteristics include an MBMS service, a unicast service, an M2M service, and the like.

The network element or the logical unit includes the base station, a core network element, or a service server. For example, the SOR controller obtains the cell resource information from the base station, or may further obtain the service requirement and the service information. Alternatively, the SOR controller obtains the service information and the service requirement from the MME or the service server.

The SOR controller may request the network element or the logical unit to download a service requirement and service information of a unicast service, or the network element or the logical unit may proactively send a service requirement and service information of a unicast service to the SOR controller.

802. The SOR controller determines, according to the cell resource information, the service information, and the service requirement, a frequency range required by a service.

The SOR controller determines, according to the cell resource information, the service information, and the service requirement that are obtained from the system network element or the system logical unit in the foregoing step, the frequency range used for the service.

803. The SOR controller informs the network element or the logical unit of the frequency range used for transmitting the service.

After the SOR controller informs the network element or the logical unit of the frequency range required for transmitting the service, the network element or the logical unit can schedule the service according to the frequency range used for the service. For example, the base station schedules the service of the UE according to the frequency range that is determined by the SOR controller for the service of the UE, and maps, into a frequency range that needs to be mapped, a DRB on which the service of the UE is carried.

If the SOR controller is a logical function entity located in the base station, a function of determining the frequency range required for transmitting the service belongs to a part of functions of the base station. Optionally, the base station negotiates, by using an interface X2, with another base station to determine the frequency range used for the service.

Persons skilled in the art can understand that a frequency range used for a service of UE may change. For example, the UE is handed over from a source cell to a target cell, and the target cell does not support a radio interface technology used by the UE, or due to interference or load, the target cell cannot provide a radio interface technology that is originally used by the UE. In this case, the target cell configures a new radio interface technology and a corresponding frequency range for the service of the UE.

Embodiment 10

Embodiment 10 of the present disclosure discloses a method for using a radio interface technology. In this embodiment, an SOR controller determines a frequency range, used by a radio interface technology, of a cell, so that a base station divides or re-divides the frequency range of the cell.

The SOR controller is used to ensure that a same frequency range is used for radio interface technologies in an adjacent intra-frequency cell set or a cell group, so as to avoid an interference problem. If different radio interface technologies are used between neighboring cells for a same frequency range, signals of the neighboring cells for the same frequency range interfere with each other because resources used by a reference signal, a control channel, or a service channel corresponding to different radio interface technologies supported by the same frequency range are not orthogonal. However, if a same radio interface technology is used between neighboring cells for a same frequency range, interference between the neighboring cells is greatly reduced because resources used by a reference signal, a control channel, or a service channel corresponding to a same radio interface technology are orthogonal, and because an existing radio interface technology is capable of canceling co-frequency interference. Therefore, the SOR controller can coordinate configurations of frequency ranges corresponding to radio interface technologies for multiple cells, and ensure relatively low co-frequency interference between neighboring cells.

An existing co-frequency interference cancellation method, for example, a soft frequency reuse (SFR) technology or a fractional frequency reuse (fractional frequency reuse) policy in an LTE system can avoid co-frequency interference between neighboring cells. For another example, a coordinated beamforming technology, a reference signal silence method, or the like in an LTE system can avoid co-frequency interference between neighboring cells.

In addition, the SOR controller may further perform configuration on a downlink/uplink subframe within a cell group in a TDD radio interface technology according to a consistent rule, avoiding interference between uplink and downlink signals of neighboring cells in which a same radio interface technology is used.

The SOR controller is an independent network element, or a logical function entity in a network element. If the SOR controller is a logical function entity located in the base station, a function of determining, by the SOR controller, a frequency range used by a radio interface technology is a part of functions of the base station. Optionally, the base station may negotiate, by using an interface X2, with another base station to determine the frequency range used by the radio interface technology.

Embodiment 11

Embodiment 11 provides a specific example of a method for using multiple radio interface technologies according to the present disclosure.

In this embodiment, when network planning is performed for a system, a whole frequency band of a cell is divided into two frequency ranges, and it is specified that a different radio interface technology is used for each of the frequency ranges. A radio interface technology used for one frequency range is an existing LTE technology, and is used for transmitting a mobile broadband unicast service. An interface technology is used for the other frequency range, and is used for transmitting an MBMS service, where the interface technology uses a CP length different from that used in the existing LTE technology for a mobile broadband unicast service. In this embodiment, a radio interface technology supported by one frequency range of the cell is an LTE radio interface technology. The LTE radio interface technology carries a DRB of a mobile broadband unicast service, and the mobile broadband unicast service uses a radio resource, a MAC entity, and a physical layer (PHY) entity that are used by the LTE technology. Correspondingly, the other frequency range uses a radio interface technology that uses a CP length of an OFDM symbol different from that used in the LTE technology. The radio interface technology carries an MBMS service, and a DRB of the MBMS service uses a radio resource, a MAC entity, and a physical layer (PHY) entity that are used by the radio interface technology that uses a frame structure different from that used in the LTE technology.

Figure 9A:
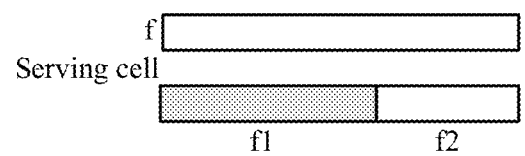
FIG. 9A is a schematic diagram of configuring a radio resource for a cell according to an embodiment of the present disclosure.

For a schematic diagram of a resource configuration manner in Embodiment 11, reference may be made to FIG. 9A.

As shown in FIG. 9A, a whole frequency band f of the cell is divided into two frequency ranges, where f1 is a common frequency range, and is used for transmitting unicast service data; and f2 is a dedicated frequency range, and is used for transmitting MBMS service data. Optionally, the f1 and the f2 are still configured in a frequency division mode, the f1 is still used for a unicast service, and the f2 is still used for transmitting an MBMS service. In addition, a unicast service and an MBMS service in the frequency range f1 are configured in a time division mode. For example, as described in the prior art, some multicast-broadcast single-frequency network (MBSFN) subframes are configured in an LTE system frame.

Bandwidths occupied by the f1 and the f2 may be dynamically adjusted by an SOR controller according to a change status of a service requirement.

Embodiment 11 discloses a process of configuring a cell resource in a service-based frequency division mode.

To better understand this embodiment of the present disclosure, the following describes the cell source configuration process disclosed in this embodiment of the present disclosure.

Main procedures of the process are: The SOR controller negotiates with a multi-cell/multicast coordination entity (MCE) on a bandwidth and information about a frequency range that are required by an MBMS service; the SOR controller determines, according to a radio resource allocation policy, frequency resources configured for a unicast service and an MBMS service; and the SOR controller informs a base station of an allocation result of the frequency resources configured for the unicast service and the MBMS service, where the resource allocation result is bandwidths and frequency ranges of the unicast service and the MBMS service. After receiving the allocation result of the frequency resources configured for the unicast service and the MBMS service, the base station starts to configure the resources for the unicast service and the MBMS service of UE. After completing negotiation with the SOR controller on the frequency range of the MBMS service, the MCE schedules the MBMS service according to a frequency resource occupied by the MBMS service.

Optionally, the SOR controller is a logical unit entity located inside the base station. The base station negotiates with another base station within an MBMS synchronization area or an MBMS service area and the MCE on the frequency ranges of the unicast service and the MBMS service. After completing negotiation on the bandwidths and the frequency ranges of the unicast service and the MBMS service, the base station starts to configure the resources for the unicast service and the MBMS service of the UE. After completing negotiation on the frequency range of the MBMS service, the MCE schedules the MBMS service according to the frequency resource occupied by the MBMS service.

Figure 9B:
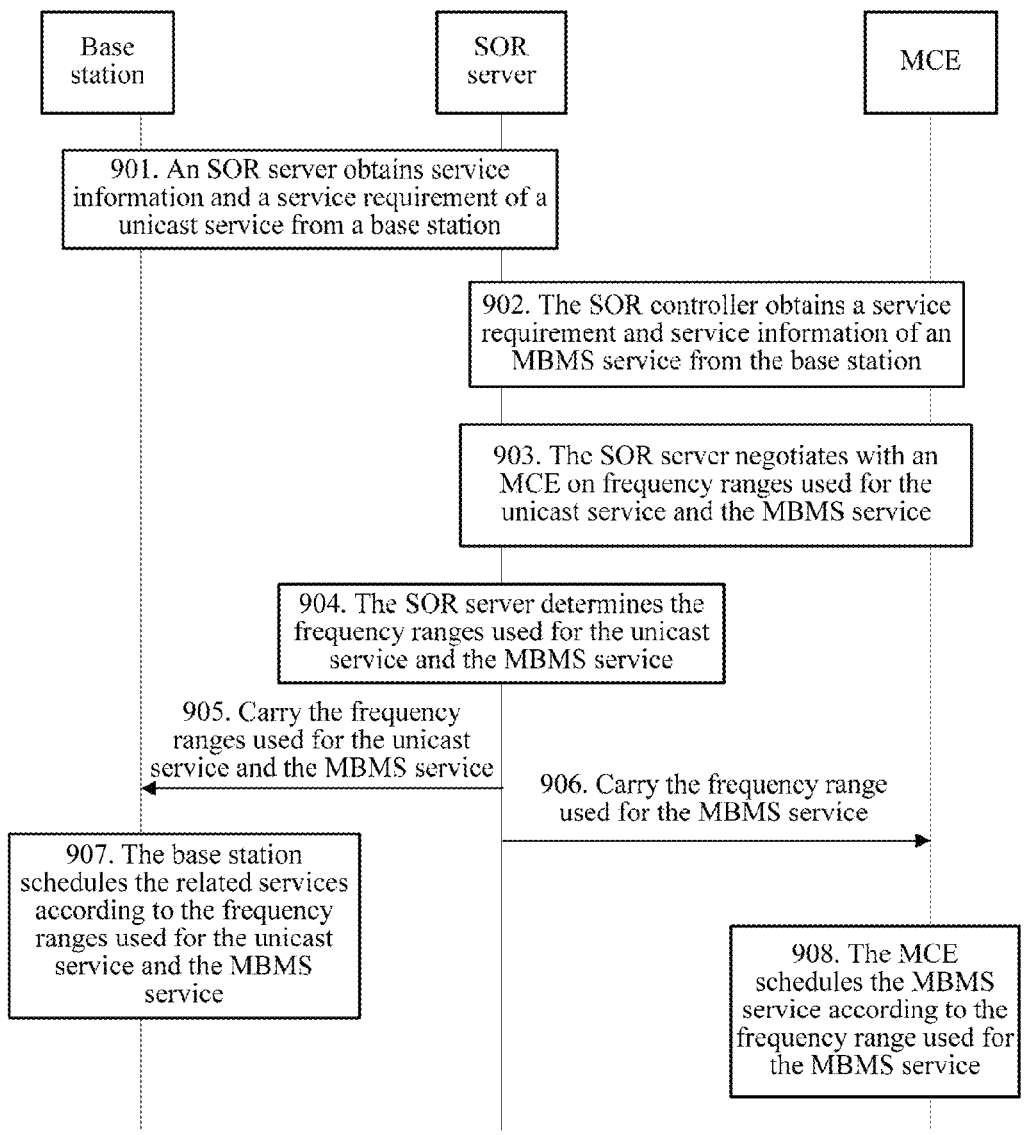
FIG. 9B is a flowchart of configuring a radio resource for a cell according to an embodiment of the present disclosure.

To better understand the process of configuring a cell resource in a frequency division mode in this embodiment, the disclosed message procedure for configuring a cell resource in a frequency division mode may include the following steps, as shown in FIG. 9B.

901. The SOR controller obtains a service requirement and service information of a unicast service from the base station.

The SOR controller may request the base station to download the service requirement and the service information of the unicast service, or the base station may proactively send the service requirement and the service information of the unicast service to the SOR controller.

902. The SOR controller obtains a service requirement and service information of an MBMS service from the base station.

903. The SOR controller negotiates with the MCE to determine frequency ranges used for the unicast service and the MBMS service.

904. The SOR controller enables a radio resource allocation policy to determine the frequency ranges used for the unicast service and the MBMS service.

905. The SOR controller informs the base station of the frequency ranges used for the unicast service and the MBMS service.

906. When the SOR controller independently determines bandwidths and the frequency ranges that are used for the unicast service and the MBMS service, the SOR controller informs the MCE of the frequency range used for the MBMS service.

907. The base station schedules the unicast service and the MBMS service according to the frequency ranges that are used for the unicast service and the MBMS service and that are informed by the SOR controller.

908. The MCE schedules the MBMS service according to the frequency range that is occupied by the MBMS service and that is informed by the SOR controller.

In addition, Embodiment 11 of the present disclosure further discloses a method for configuring a frequency channel and a common channel of a system, and a system information configuration method when UE accesses a wireless network in a centralized manner.

The method, disclosed in this embodiment, for configuring a frequency channel and a common channel of a system is as follows.

Three manners for setting a center frequency and a common channel of a cell are as follows.

Manner 1:

The system separately sets a center frequency for the f1 and the f1. The center frequency of the f1 is set at a center frequency of the f1, and the center frequency of the f2 is set at a center frequency of the f2.

The system sets a common channel in the corresponding frequency range f1. The common channel includes a synchronization channel (PSS/SSS), a cell-specific reference signal (CRS), a broadcast channel (BCH), a paging channel (PCH), and a random access channel.

The system does not set a common channel in the f2. The common channel includes a synchronization channel/a broadcast channel (PSS/SSS/BCH), a cell-specific reference signal (CRS), a paging channel (PCH), and a random access channel.

Physical layer processes of the UE such as a synchronization process, a measurement process, a system information reading process, a random access process, and a paging process are all implemented in the frequency range f1. Before accessing the system, the UE can tune in a receiver only to a frequency band corresponding to the f1 for access because cell discovery and network access are supported only on the frequency band corresponding to the f1.

In manner 1, the UE accesses the wireless network by using the common frequency range, that is, accesses the wireless network in the f1.

Manner 2:

The system sets only one center frequency, where the center frequency is set at a center frequency of a whole carrier frequency band f of the cell.

The system sets a common channel of the system on a frequency bandwidth of the f. The common channel includes a synchronization channel (PSS/SSS), a cell-specific reference signal (CRSl), a broadcast channel (BCH), a paging channel (PCH), and a random access channel.

Physical layer processes of the UE such as a synchronization process, a measurement process, a system information reading process, a random access process, and a paging process are all implemented on the whole cell bandwidth corresponding to the f Before accessing the system, the UE needs to tune in a receiver to the whole frequency band f for access because the system supports cell discovery and network access on the whole frequency band f In manner 2, the UE accesses the wireless network on the whole frequency band of the cell, that is, accesses the wireless network on the f Manner 3:

The system separately sets a center frequency for the f1 and the f2. The center frequency of the f1 is set at a center frequency of the f1, and the center frequency of the f2 is set at a center frequency of the f2.

The system sets a common channel in the corresponding frequency range f1. The common channel includes one or more of a synchronization channel (PSS/SSS), a cell-specific reference signal (CRS), a broadcast channel (BCH), a paging channel (PCH), or a random access resource. The common channel in the frequency range f1 is a common channel for a unicast service. For example, the random access resource in the frequency range f1 is used for access of the unicast service. For another example, the BCH in the frequency range f1 is used for a radio interface technology corresponding to the unicast service.

In addition, the system also sets a common channel in the f2. The common channel includes one or more of a synchronization channel/a broadcast channel (PSS/SSS/BCH), a cell-specific reference signal (CRS), a paging channel (PCH), or a random access channel. The common channel in the frequency range f2 is a common channel for an MBMS. For example, the random access resource in the frequency range f2 is used for access of the MBMS service. For another example, the BCH in the frequency range f2 is used for a radio interface technology corresponding to the MBMS service.

Physical layer processes of the UE such as a synchronization process, a measurement process, a system information reading process, a random access process, and a paging process may be implemented in the frequency range f1 or the frequency range f1. Before accessing the system, the UE first needs to tune in a receiver to a frequency band corresponding to the f1 for wireless network access. Alternatively, before accessing the system, the UE first needs to tune in a receiver to a frequency band corresponding to the f2 for wireless network access. Cell discovery and access are supported both on the frequency band corresponding to the f1 and the frequency band corresponding to the f2.

In manner 3, the UE accesses the wireless network by using the dedicated frequency range, that is, accesses the wireless network in the f1 or the f2.

Embodiment 11 of the present disclosure further discloses a system information configuration method, and the system information configuration method is specifically described as follows. The UE can access the wireless network by using the common frequency range according to the system information configuration method.

A master information block MIB of system information broadcasts an actual downlink cell bandwidth. The downlink cell bandwidth is a bandwidth of the f1 or a bandwidth of the whole frequency band f of the cell. Specifically, whether the bandwidth of the f1 or the bandwidth of the f is broadcast is determined according to a manner for configuring a center frequency. If the system configures the frequency channel and the common channel of the system in the foregoing manner 1, the MIB broadcasts the bandwidth of the frequency band corresponding to the f1. If the system configures the frequency channel and the common channel of the system in the foregoing manner 2, the MIB broadcasts the bandwidth of the frequency band f An MBMS system frame-subframe configuration (MBSFN-SubframeConfig) of the frequency band corresponding to the f2 is added to a system information block 2 (SIB 2). The MBSFN-SubframeConfig may be any frame in the system. Optionally, because an MBMS service subframe may further be configured on the frequency band corresponding to the f1, the MBMSFN subframe on the frequency band corresponding to the f1 may also be configured in the SIB 2. Specifically, the SIB 2 needs to indicate the MBMSFN subframe configuration on the frequency bands corresponding to the f1 and the f2. Optionally, no MBMSFN subframe on the frequency band corresponding to the f2 is configured in the SIB 2, and the UE may use all subframes on the frequency band corresponding to the f2 as the MBMSFN subframe.

Bandwidth information of the frequency band corresponding to the f2 is added to the SIB 2. Optionally, if the bandwidth of the frequency band corresponding to the f2 is not added to the system information block SIB2, the bandwidth of the frequency band corresponding to the f2 may be added to a SIB 1.

An information element of an MBSFN area information list (mbsfn-area info list-r9) in a system information block 31 (SIB 13) is modified as follows:

An information element mcch-config-r9 in the mbsfn-area info list-r9 indicates that an MBMS control channel (MCCH) of a radio interface technology used for the frequency band corresponding to the f2 may use any subframe of the interface technology used for the frequency band corresponding to the f2.

Optionally, if the system also configures the MBSFN subframe on the frequency band corresponding to the f1, the SIB 13 may also need to configure an MCCH for a radio interface technology used for the frequency band corresponding to the f1.

In a same MBSFN area, manners for allocating MBMS service resources of the frequency bands corresponding to the f1 and f2 of all cells are the same. Specifically, an MBMSFN subframe for the radio interface technology used for the frequency band corresponding to the f2 is the same as an MBMSFN subframe for the radio interface technology used for the frequency band corresponding to the f1, and an MCCH configuration of the radio interface technology used for the frequency band corresponding to the f2 is the same as an MCCH configuration of the interface technology used for the frequency band corresponding to the f1.

Persons skilled in the art can understand that cell discovery and network access are not supported in the f2 because there is no common channel on the frequency band corresponding to the f2. The UE can access the wireless network only by using system information of the frequency band corresponding to the f1, or access the wireless network only by using system information of the whole frequency band f. Therefore, two OFDMs required by a PDCCH do not need to be reserved for the radio interface technology used for the frequency band corresponding to the f2, and all symbols of each subframe of the frequency band corresponding to the f2 are used for an eMBMS. Optionally, in consideration of system backward compatibility, the two OFDMs required by the PDCCH may be reserved for the radio interface technology used for the frequency band corresponding to the f2.

Persons skilled in the art can learn that, because there is no common channel of the f2, radio resource management (RRM) of a serving cell/neighboring cell of the UE can be measured only based on measurement of CRS quality of the frequency band corresponding to the f1, or measured only based on measurement of CRS quality of the whole frequency band f of the cell. The UE can measure channel status information (CSI) of the serving cell only based on a channel status information reference signal CSI-RS of the frequency band corresponding to the f1, or based on a channel status information reference signal CSI-RS of the whole frequency band f of the cell.

It can be understood that, if the system configures an MBMSFN subframe on the frequency band corresponding to the f1, an MBMS counting response message may be sent by using an MBMS uplink channel of the frequency band corresponding to the f1. Otherwise, the MBMS counting response message is sent by using an MBMS uplink channel of the frequency band corresponding to the f2.

The base station completes steps after the system sends a broadcast message, including: an implementation process of mapping a DRB of the UE into a specified frequency range, and an operation process of transmitting, by the base station side by using a radio interface technology supported by the frequency range into which the DRB is mapped, a service carried on the service bearer DRB with the base station. The implementation process and the operation process are consistent with those in Embodiment 4. Details are not described herein again.

Subsequent operation steps of the UE are consistent with those in Embodiment 7. Details are not elaborated herein. The operation steps include: The UE receives frequency band information of the N frequency ranges, a correspondence between the N frequency ranges and radio interface technologies, or characteristic information of the radio interface technology, and random access resource information of the cell that are sent by the base station; the UE accesses the wireless network or performs uplink synchronization by using the random access resource of the cell sent by the base station; the UE receives indication information sent by the base station, and maps each service bearer DRB of the UE into a frequency range specified by the base station; and the UE transmits, by using a radio interface technology supported by the frequency range into which the DRB is mapped, a service carried on the service bearer DRB with the base station.

Persons skilled in the art can learn that the UE accessing the foregoing system may be dual transceiver UE, or may be a single transceiver UE. Both the dual transceiver UE and the single transceiver UE may perform a unicast service on the frequency band corresponding to the f1 and an MBMS service on the frequency band corresponding to the f2 at the same time. The dual transceiver UE and the single transceiver UE may further perform an MBMS service on the frequency band corresponding to the f2 in addition to receiving a paging message on the frequency band corresponding to the f1.

Embodiment 12

Embodiment 12 of the present disclosure provides a base station device.

Figure 10:
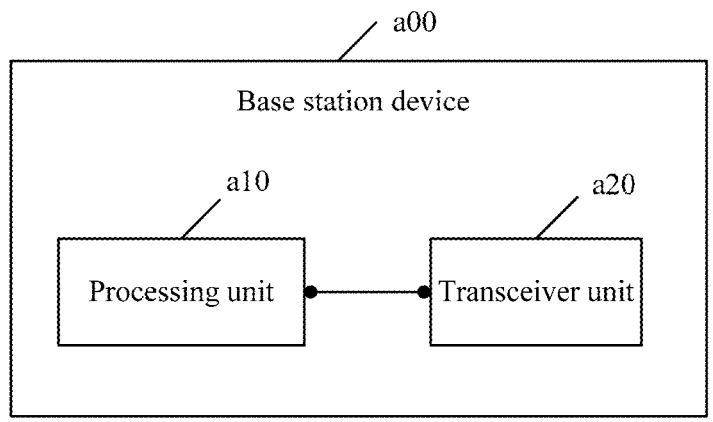
FIG. 10 is a schematic diagram of a base station device according to an embodiment of the present disclosure.

Referring to FIG. 10, the base station device a00 may include:

a processing unit a10, configured to divide a frequency band of a cell into N frequency ranges, where each of the N frequency ranges supports one radio interface technology, and the cell supports at least two radio interface technologies; and a transceiver unit a20, configured to send frequency band information of the N frequency ranges, a correspondence between the N frequency ranges and radio interface technologies, or characteristic information of the radio interface technology, and random access resource information of the cell to UE, where the random access resource information is used to instruct the UE to access the cell or instruct the UE to perform uplink synchronization with the cell; where the processing unit a10 is further configured to map a service radio bearer DRB of the UE into at least one frequency range of the N frequency ranges, where each of the DRB is corresponding to one of the at least one frequency range, and each of the at least one frequency range is corresponding to at least one of the DRB; and the transceiver unit a20 is further configured to transmit, by using a radio interface technology supported by the frequency range into which the DRB is mapped, a service carried on the DRB with the UE; where N is an integer, and N≥2.

The frequency range includes a common frequency range and a dedicated frequency range. The common frequency range is a frequency range shared by radio interface technologies supported by the N frequency ranges, and includes a radio resource required by a common channel, or a radio resource required by a common channel and a signaling radio bearer SRB. The common frequency range further includes a radio resource required by a DRB. The dedicated frequency range is a frequency range used by the radio interface technology individually, and the dedicated frequency range carries a radio resource required by a DRB. The dedicated frequency range further includes a radio resource required by an SRB.

Alternatively, the frequency range may include only a dedicated frequency range. The dedicated frequency range is a frequency range used by the radio interface technology individually, and includes a common channel, a radio resource required by an SRB, and a radio resource required by a DRB.

The common channel includes a synchronization channel, a cell-specific reference signal, a broadcast channel, a paging channel, or a random access channel.

The characteristic information of the radio interface technology includes a multiple access mode of the radio interface technology, a frame structure of the radio interface technology, a physical channel characteristic of the radio interface technology, an uplink-downlink subframe configuration of the radio interface technology, or a physical channel resource configuration of the radio interface technology.

The processing unit a20 is further configured to map an SRB of the UE into at least one frequency range of the N frequency ranges, where each of the SRB is corresponding to one of the at least one frequency range, and each of the at least one frequency range is corresponding to at least one of the SRB;

the transceiver unit a20 is further configured to send first indication information to the UE, where the first indication information is used to indicate, to the UE, a frequency range into which the SRB needs to be mapped; and the transceiver unit a20 is further configured to send RRC signaling to the UE by using a radio interface technology supported by the frequency range into which the SRB is mapped, where the RRC signaling is used to establish the DRB of the UE.

The transceiver unit a20 unit is specifically configured to:

send a system broadcast message or a RRC control signaling to the UE by using the common frequency range, where the system broadcast message or the RRC control signaling includes frequency band information of the common frequency range and frequency band information of the dedicated frequency range; or send the system broadcast message or the RRC control signaling to the UE by using the dedicated frequency range, where the system broadcast message or the RRC control signaling includes frequency band information of the dedicated frequency range.

After performing cell resource configuration, the processing unit a10 starts to perform frequency range mapping for the DRB of the UE. The transceiver unit a20 may send frequency band information of each of the frequency ranges of the cell, the correspondence between the frequency ranges and the radio interface technologies, or the characteristic information of the radio interface technology to the UE after the processing unit a10 performs cell resource configuration. After completing frequency range mapping for the DRB of the UE, the transceiver unit a20 sends, to the UE by using an indication message, the frequency range into which the DRB of the UE needs to be mapped.

For example, the processing unit a10 divides the whole frequency range of the cell into two frequency ranges, and uses two different radio interface technologies. One radio interface technology is an existing LTE technology, is corresponding to the common frequency range, and is used for transmitting the common channel and a mobile broadband unicast service bearer. The other radio interface technology uses a frame structure different from that used in the existing LTE technology. Optionally, the other radio interface technology may further use a different multiple access technology such as SCMA, is corresponding to the dedicated frequency range, and is used for transmitting an ultra-low latency M2M service bearer.

The transceiver unit a20 sends, to the UE by using the system broadcast message of the common frequency range, frequency band information of the two frequency bands that are obtained by means of division, and sends a correspondence between the common frequency range and the existing LTE technology and a correspondence between the dedicated frequency range and the radio interface technology different from the existing LTE technology to the UE. Then, the UE may select a corresponding frequency range according to a type of a service to be initiated, and complete a wireless network access process.

After the UE accesses the network, the processing unit a10 may map, according to the type of the service to be initiated by the UE, a DRB of the UE into a frequency range that needs to be mapped. For example, the UE maps a DRB of an ultra-low latency M2M service into a frequency range corresponding to ultra-low latency M2M, and maps a DRB of a mobile broadband unicast service into a frequency range corresponding to the LTE technology.

The transceiver unit a20 sends an RRC connection reconfiguration message to the UE according to a DRB mapping result, and informs the UE of the frequency range that is configured by the processing unit a10 for the DRB of the UE.

In some feasible implementations, units in the base station device described in this embodiment of the present disclosure may be configured to perform implementations described in embodiments corresponding to the method, provided in the embodiments of the present disclosure, for using multiple radio interface technologies. For specific implementation processes, reference may be made to the foregoing embodiments. Details are not described herein again.

Embodiment 13

Embodiment 13 provides a terminal device, to cooperate with the base station device in Embodiment 12. The base station device divides a frequency band of a cell into N frequency ranges. Each of the N frequency ranges supports one radio interface technology, and N is an integer greater than or equal to 2.

Figure 11:
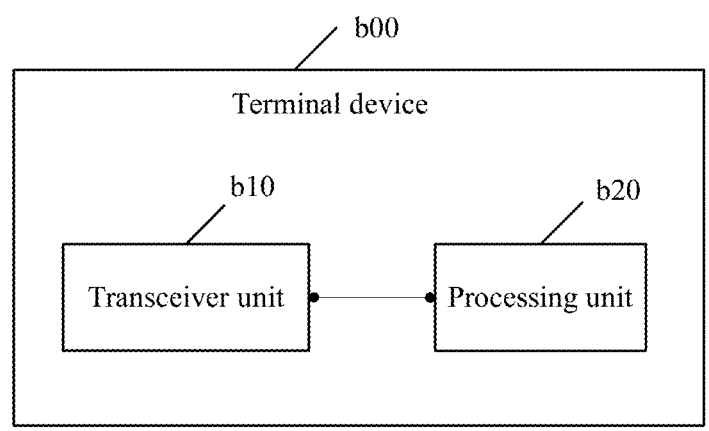
FIG. 11 is a schematic diagram of a terminal device according to an embodiment of the present disclosure.

Referring to FIG. 11, the terminal device b00 may include:

a transceiver unit b10, configured to receive frequency band information of the N frequency ranges, a correspondence between the N frequency ranges and radio interface technologies, or characteristic information of the radio interface technology, and random access resource information of the cell that are sent by the base station, where the random access resource information is used to instruct the UE to access the cell or instruct the UE to perform uplink synchronization with the cell;

a processing unit b20, configured to access a wireless network or perform uplink synchronization according to the random access resource of the cell sent by the base station; where the transceiver unit b10 is further configured to receive indication information sent by the base station, where the indication information is used to indicate a frequency range into which a data radio bearer DRB of the UE needs to be mapped;

the processing unit b20 is further configured to map the DRB of the UE into the frequency range into which the DRB needs to be mapped; and the transceiver unit b10 is further configured to transmit, by using a radio interface technology supported by the frequency range into which the DRB is mapped, a service carried on the DRB with the base station; where N is an integer, and N≥2.

The N frequency ranges include a common frequency range and a dedicated frequency range, or include a dedicated frequency range. The transceiver unit b10 is configured to receive, from a system broadcast message or Radio Resource Control RRC signaling that is sent by the base station, the frequency band information of the N frequency ranges that is sent by the base station.

The transceiver unit b10 is specifically configured to:

receive the system broadcast message or the RRC control signaling that is sent by the base station by using the common frequency range, where the system broadcast message or the RRC control signaling includes frequency band information of the common frequency range and frequency band information of the dedicated frequency range; or receive the system broadcast message or the RRC control signaling that is sent by the base station by using the dedicated frequency range, where the system broadcast message or the RRC control signaling includes frequency band information of the dedicated frequency range.

The transceiver unit b10 receives the correspondence between the N frequency ranges and the radio interface technologies or the characteristic information of the radio interface technology by using the system broadcast message sent by the base station; or receives the correspondence between the N frequency ranges and the radio interface technologies or the characteristic information of the radio interface technology by using the RRC signaling sent by the base station; or receives the correspondence between the N frequency ranges and the radio interface technologies or the characteristic information of the radio interface technology by using a Media Access Control MAC control element CE sent by the base station; or receives the correspondence between the N frequency ranges and the radio interface technologies or the characteristic information of the radio interface technology by using a physical downlink control channel PDCCH sent by the base station.

The transceiver unit b10 is further configured to:

receive first indication information sent by the base station, where the first indication information is used to indicate a frequency range into which a signaling radio bearer SRB of the UE needs to be mapped;

map the SRB of the UE into the frequency range into which the SRB needs to be mapped; and transmit RRC signaling with the base station by using a radio interface technology supported by the frequency range into which the SRB is mapped, where the RRC signaling is used to establish the DRB of the UE.

The transceiver unit b10 is further configured to receive a system broadcast message; and when the system broadcast information is system broadcast information of a common frequency range, the processing unit b20 is further configured to access a wireless network by using the common frequency range.

The processing unit b20 is specifically configured to:

learn, by using the indication information that is sent by the base station and that is received by the transceiver unit, the radio interface technology supported by the frequency range into which the DRB needs to be mapped, and map the DRB into the radio interface technology supported by the frequency range into which the DRB needs to be mapped.

The processing unit is specifically configured to:

learn, by using the first indication information that is sent by the base station and that is received by the transceiver unit b10, the radio interface technology supported by the frequency range into which the SRB needs to be mapped, and map the SRB into the radio interface technology supported by the frequency range into which the SRB needs to be mapped.

For example, the transceiver unit b10 reads the broadcast message of the common frequency range. The broadcast message includes frequency band information of each frequency range of the cell, a correspondence between the frequency ranges and the radio interface technologies, or characteristic information of the radio interface technology, and random access resource information of the cell. The UE learns that the frequency range of the cell is divided into two frequency ranges, and two different radio interface technologies are used. One radio interface technology is an existing LTE technology, is corresponding to the common frequency range, and is used for transmitting the common channel and a mobile broadband unicast service bearer. The other radio interface technology uses a frame structure different from that used in the existing LTE technology, is corresponding to the dedicated frequency range, and is used for transmitting an ultra-low latency M2M service bearer.

Then, the processing unit b20 may select a corresponding frequency range according to a type of a service to be initiated, and complete a wireless network access process. After the UE accesses the network, the transceiver unit b10 may receive an RRC connection reconfiguration message sent by the base station. The RRC connection reconfiguration message includes a frequency range into which a DRB needs to be mapped, where the DRB is used to carry the service initiated by the UE. The processing unit b20 maps, according to an indication in the RRC connection reconfiguration message, the DRB into the frequency range that needs to be mapped, for example, maps a DRB of an ultra-low latency M2M service into a frequency range corresponding to ultra-low latency M2M, and maps a DRB of a mobile broadband unicast service into a frequency range corresponding to the LTE technology.

In some feasible implementations, units in the terminal device described in this embodiment of the present disclosure may be configured to perform implementations described in embodiments corresponding to the method, provided in the embodiments of the present disclosure, for using a radio interface technology. For specific implementation processes, reference may be made to the foregoing embodiments. Details are not described herein again.

Embodiment 14

Embodiment 14 of the present disclosure provides another base station device.

Figure 12:
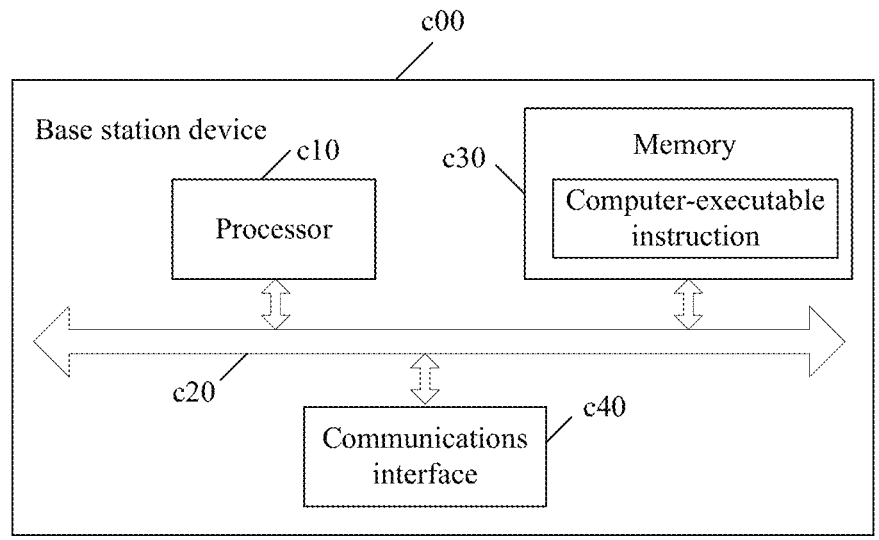
FIG. 12 is a schematic diagram of another base station device according to an embodiment of the present disclosure.

FIG. 12 is a schematic diagram of the another base station device according to this embodiment. As shown in FIG. 12, in terms of hardware, the base station device c00 provided in this embodiment includes at least one processor c10, a bus c20, and at least one memory c30 and at least one communications interface c40 that are connected to the bus.

The memory c30 is configured to store a computer-executable instruction. The processor c10 invokes, by using the bus c20, the computer-executable instruction stored in the memory c30 and executes the computer instruction. When sending data to an external device, the processor c10 writes data that has been completely processed into the memory c30 by using the bus, and sends the data that has been completely processed to the communications interface c40 by using the bus c20; and the communications interfaces c40 sends the data to the external device. When receiving data sent by an external device, the communications interface c40 receives the data from the external device, and writes, by using the bus c20, the data into the memory c30 for the processor c10 to process the data. In this way, the base station device is enabled to perform the method in any of Embodiments 1 to 5 of the present disclosure or Embodiment 11 of the present disclosure.

The processor c10 divides a frequency band of a cell into N frequency ranges, where each of the N frequency ranges supports one radio interface technology, and the cell supports at least two radio interface technologies; and sends frequency band information of the N frequency ranges, a correspondence between the N frequency ranges and radio interface technologies, or characteristic information of the radio interface technology, and random access resource information of the cell to the communications interface c40, where N is an integer, and N≥2.

Then, the communications interface c40 sends the frequency band information of the N frequency ranges, the correspondence between the N frequency ranges and the radio interface technologies, or the characteristic information of the radio interface technology, and the random access resource information of the cell to UE, where the random access resource information is used to instruct the UE to access the cell or instruct the UE to perform uplink synchronization with the cell.

After the UE accesses a network or completes uplink synchronization, the processor c10 maps a service radio bearer DRB of the UE into at least one frequency range of the N frequency ranges, where each of the DRB is corresponding to one of the at least one frequency range, and each of the at least one frequency range is corresponding to at least one of the DRB.

The communications interface c40 transmits a service carried on the DRB with the UE. When transmitting the DRB with the UE, the base station device uses a radio interface technology supported by the frequency range into which the DRB is mapped. When the base station device receives data sent by the UE, the communications interface c40 writes the service data into the memory c30 for the processor c10 to process the data. When the base station device sends service data of the UE, the communications interface c40 sends the data that has been completely processed by the processor c10 and that is stored in the memory c30 to the UE.

The frequency ranges that are obtained by means of division by the processor c10 include a common frequency range and a dedicated frequency range. The common frequency range is a frequency range shared by radio interface technologies supported by the N frequency ranges, and includes a radio resource required by a common channel, or a radio resource required by a common channel and a signaling radio bearer SRB. The common frequency range further includes a radio resource required by a DRB. The dedicated frequency range is a frequency range used by the radio interface technology individually, and the dedicated frequency range carries a radio resource required by a DRB. The dedicated frequency range further includes a radio resource required by an SRB.

Alternatively, the frequency range may include only a dedicated frequency range. The dedicated frequency range is a frequency range used by the radio interface technology individually, and includes a common channel, a radio resource required by an SRB, and a radio resource required by a DRB.

The common channel includes a synchronization channel, a cell-specific reference signal, a broadcast channel, a paging channel, or a random access channel.

The characteristic information of the radio interface technology includes a multiple access mode of the radio interface technology, a frame structure of the radio interface technology, a physical channel characteristic of the radio interface technology, an uplink-downlink subframe configuration of the radio interface technology, or a physical channel resource configuration of the radio interface technology.

Before the processor c10 maps the DRB of the UE into the frequency range that needs to be mapped, the processor c10 may further need to map an SRB of the UE into at least one frequency range of the N frequency ranges, where each of the SRB is corresponding to one of the at least one frequency range, and each of the at least one frequency range is corresponding to at least one of the SRB; and send first indication information to the communications interface c40, where the first indication information is used to indicate, to the UE, a frequency range into which the SRB needs to be mapped;

the communications interface c40 sends the first indication information to the UE; and the communications interface c40 sends RRC signaling to the UE by using a radio interface technology supported by the frequency range into which the SRB is mapped, where the RRC signaling is used to establish the DRB of the UE; and when sending the RRC signaling, the communications interface c40 sends the RRC signaling that is generated by the processor c10 and that is stored in the memory c30 to the UE.

A method for sending, by the base station device, the frequency band information of the N frequency ranges to the UE includes:

sending a system broadcast message or RRC control signaling that is of the common frequency range to the UE, where the system broadcast message or the RRC control signaling includes frequency band information of the common frequency range and frequency band information of the dedicated frequency range; or sending a system broadcast message or RRC control signaling that is of the dedicated frequency range to the UE, where the system broadcast message or the RRC control signaling includes frequency band information of the dedicated frequency range, where the system broadcast message or the RRC control signaling that is sent by the base station device is generated by the processor c10 and is sent to the UE by using the communications interface c40.

In some feasible implementations, hardware units in the base station device described in this embodiment of the present disclosure may be configured to perform implementations described in embodiments corresponding to the method, provided in the embodiments of the present disclosure, for using multiple radio interface technologies. For specific implementation processes, reference may be made to the foregoing embodiments. Details are not described herein again.

Embodiment 15

Embodiment 15 of the present disclosure provides another terminal device.

Figure 13:
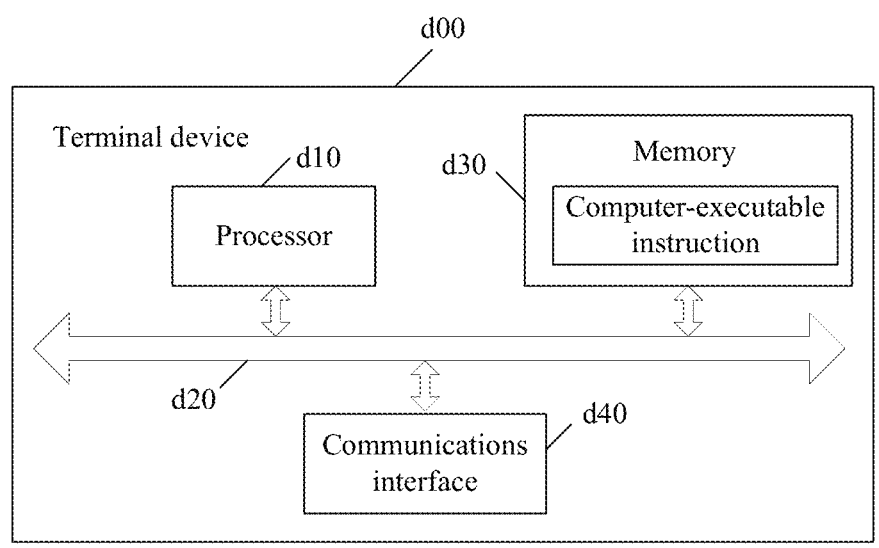
FIG. 13 is a schematic diagram of another terminal device according to an embodiment of the present disclosure.

FIG. 13 is a schematic diagram of the another terminal device according to this embodiment. As shown in FIG. 13, in terms of hardware, the terminal device d00 provided in this embodiment includes at least one processor d10, a bus d20, and at least one memory d30 and at least one communications interface d40 that are connected to the bus.

The memory d30 is configured to store a computer-executable instruction. The processor d10 invokes, by using the bus d20, the computer-executable instruction stored in the memory d30 and executes the instruction. When receiving data sent by an external device, the communications interface d40 is configured to receive the data from the external device, and writes the data into the memory d30 by using the bus d20; and the processor d10 processes the data written into the memory d30. When sending data to an external device, the processor d10 writes data that has been completely processed into the memory d30 by using the bus, and sends the data that has been completely processed to the communications interface d40 by using the bus d20; and the communications interface d40 sends the data to the external device. In this way, the terminal device is enabled to perform the method in any of Embodiments 6 to 8.

The communications interface d40 receives frequency band information of N frequency ranges, a correspondence between the N frequency ranges and radio interface technologies, or characteristic information of the radio interface technology, and random access resource information of a cell that are sent by a base station, where the random access resource information is used to instruct the terminal device to access the cell or instruct the terminal to perform uplink synchronization with the cell; and writes the frequency band information of the N frequency ranges, the correspondence between the N frequency ranges and the radio interface technologies, or the characteristic information of the radio interface technology, and the random access resource information of the cell into the memory d30 for use by the processor d10. The communications interface d40 may receive, from a system broadcast message or Radio Resource Control RRC signaling that is sent by the base station, the frequency band information of the N frequency ranges that is sent by the base station.

The processor d10 enables the terminal device to access a wireless network or perform uplink synchronization according to the random access resource information. After the terminal device accesses the network or completes uplink synchronization, the communications interface d40 receives indication information sent by the base station, where the indication information is used to indicate a frequency range into which a data radio bearer DRB of the UE needs to be mapped. The processor d10 processes the indication information, learns the frequency range into which the DRB needs to be mapped, and maps the DRB of the UE into the frequency range into which the DRB needs to be mapped.

Then, the terminal device transmits, by using the communications interface d40, a service carried on the DRB with the base station.

The communications interface d40 may receive the system broadcast message or the RRC control signaling that is sent by the base station by using a common frequency range, where the system broadcast message or the RRC control signaling includes frequency band information of the common frequency range and frequency band information of a dedicated frequency range; or receive the system broadcast message or the RRC control signaling that is sent by the base station by using a dedicated frequency range, where the system broadcast message or the RRC control signaling includes frequency band information of the dedicated frequency range.

The communications interface d40 may receive the system broadcast message sent by the base station, so that the processor d10 obtains the correspondence between the N frequency ranges and the radio interface technologies or the characteristic information of the radio interface technology from the broadcast message; or the communications interface d40 may receive the RRC signaling sent by the base station, so that the processor d10 obtains the correspondence between the N frequency ranges and the radio interface technologies or the characteristic information of the radio interface technology from the RRC signaling; or the communications interface d40 may receive a MAC CE sent by the base station, so that the processor d10 obtains the correspondence between the N frequency ranges and the radio interface technologies or the characteristic information of the radio interface technology; or the communications interface d40 may receive a PDCCH sent by the base station, so that the processor d10 obtains the correspondence between the N frequency ranges and the radio interface technologies or the characteristic information of the radio interface technology from the PDCCH.

The communications interface d40 may further receive first indication information sent by the base station. The first indication information is used to indicate a frequency range into which a signaling radio bearer SRB of the UE needs to be mapped, and the first indication information is used by the processor d10 to map the SRB of the UE into the frequency range into which the SRB needs to be mapped.

After the SRB is mapped into the frequency range that needs to be mapped, the terminal device may transmit RRC signaling with the base station by using a radio interface technology supported by the frequency range into which the SRB is mapped. The RRC signaling is generated by the processor d10 and is sent to the external device by using the communications interface d40. The RRC signaling is used to establish the DRB of the UE.

The processor d10 further needs to receive a system broadcast message by using the communications interface d40; and when the system broadcast information is system broadcast information of the common frequency range, the terminal device accesses a wireless network by using the common frequency range.

That the processor d10 maps the DRB of the UE into the frequency range into which the DRB needs to be mapped includes: the processor d10 learns, by using the indication information sent by the base station, a radio interface technology supported by the frequency range into which the DRB needs to be mapped, and maps the DRB into the radio interface technology supported by the frequency range into which the DRB needs to be mapped.

That the processor d10 maps the SRB of the UE into the frequency range into which the SRB needs to be mapped includes: the processor d10 learns, by using the first indication information sent by the base station, the radio interface technology supported by the frequency range into which the SRB needs to be mapped, and maps the SRB into the radio interface technology supported by the frequency range into which the SRB needs to be mapped.

In some feasible implementations, hardware units in the terminal device described in this embodiment of the present disclosure may be configured to perform implementations described in embodiments corresponding to the method, provided in the embodiments of the present disclosure, for using multiple radio interface technologies. For specific implementation processes, reference may be made to the foregoing embodiments. Details are not described herein again.

Embodiment 16

Embodiment 16 of the present disclosure provides a communications system.

Figure 14:
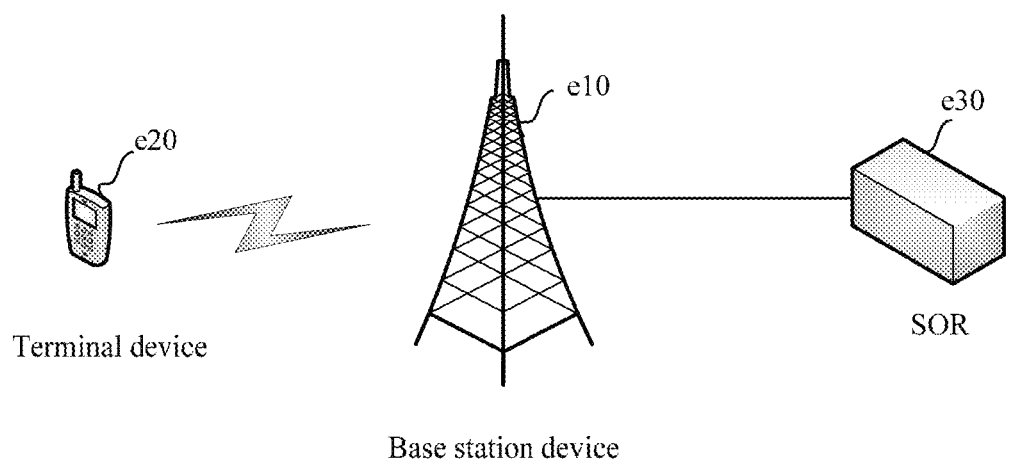
FIG. 14 is a schematic diagram of a communications system according to an embodiment of the present disclosure.

Referring to FIG. 14, the communications system may include the base station device e10 in Embodiment 12 of the present disclosure, the terminal device e20 in Embodiment 13 of the present disclosure, and an SOR controller e30. The SOR is configured for performing radio resource control by the communications system.

The base station device e10 divides a frequency band of a cell into N frequency ranges, determines frequency bands used for the N frequency ranges, and determines a radio interface technology supported by each of the N frequency ranges and a characteristic of the radio interface technology, where the cell supports at least two different radio interface technologies, N is an integer, and N≥2. The base station device e10 sends the frequency band information of each of the N frequency ranges, a correspondence between the N frequency ranges and radio interface technologies, or the characteristic information of the radio interface technology, and random access resource information of the cell to the terminal device e20. In this case, the terminal device e20 may select a corresponding frequency range according to a type of a service to be initiated, and complete a wireless network access process. After the terminal device e20 accesses a network, the base station device e10 may map, according to the type of the service initiated by the terminal device e20, a DRB of the terminal device e20 into a frequency range into which the DRB needs to be mapped. The base station device e10 sends, to the terminal device c20 by using indication information, the frequency range into which the DRB of the terminal device e20 needs to be mapped.

The terminal device e20 first receives the frequency band information of each of the N frequency ranges, the correspondence between the N frequency ranges and the radio interface technologies, or the characteristic information of the radio interface technology, and the random access resource information of the cell that are sent by the base station device e10, and performs network access according to the random access resource. When the UE initiates a service, the terminal device e20 receives the indication information that indicates the frequency range into which the DRB for the service needs to be mapped and that is sent by the base station device e10. The terminal device e20 maps, according to the indication information, the DRB for the service into the frequency range that needs to be mapped.

The SOR controller e30 is specifically configured to:

determine the frequency range used for the service in the system, so that the base station device e10 maps, into the frequency range that needs to be mapped, the DRB on which the service is carried; and determine a frequency range, used by a radio interface technology, of the cell, so that the base station device e10 divides or re-divides the frequency range of the cell.

After obtaining, from the SOR e30, the frequency range used by the radio interface technology and the frequency range used for the service, the base station device e10 divides the frequency range of the cell.

The SOR controller e30 used as a radio resource controller is an independent network element device, or a logical function unit located in a network element device, for example, located in the base station, or located in a mobile management entity (MME). If the SOR controller is located in the base station, a function of the SOR controller is a part of functions of the base station. The base station may negotiate, by using an interface X2, with another base station on the frequency range used for the service and the frequency range used by the radio interface technology.

For example, the SOR controller e30 used as a radio resource controller determines a frequency range for an LTE technology and a frequency range for a radio interface technology that uses a frame structure different from that used in the LTE technology, and respectively determines, according to requirements and service characteristic information of a mobile broadband unicast service and an M2M service, a frequency range used for the mobile broadband unicast service and a frequency range used for the M2M service. The requirements and the service characteristic information of the mobile broadband unicast service and the M2M service may be obtained from the base station device e10 or the MME. In this embodiment, the SOR controller e30 determines that the frequency range used for the mobile broadband unicast service is the frequency range used by the LTE technology, and determines that the frequency range used for the M2M service is the frequency range used by the radio interface technology that uses a frame structure different from that used in the LTE technology.

The base station device e10 divides a whole frequency range of a cell into two frequency ranges according to the frequency ranges used by the radio interface technologies and the frequency ranges used for the services, where the frequency ranges used by the radio interface technologies and the frequency ranges used for the services are determined by the SOR controller, and uses two different radio interface technologies. One radio interface technology is an existing LTE technology, is corresponding to the common frequency range, and is used for transmitting a common channel and a mobile broadband unicast service bearer. The other radio interface technology uses a frame structure different from that used in the existing LTE technology, and is used for transmitting an ultra-low latency M2M service bearer.

In some feasible implementations, the base station device and the terminal device that are described in this embodiment of the present disclosure may be configured to perform implementations described in embodiments corresponding to the method, provided in the embodiments of the present disclosure, for using a radio interface technology. For specific implementation processes, reference may be made to the foregoing embodiments. Details are not described herein again.

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions in the embodiments of the present disclosure.

Persons of ordinary skill in the art can understand that all or some of the procedures of the methods in the embodiments may be implemented by a computer program instructing relevant hardware. The program may be stored in a computer readable storage medium. When the program runs, the procedures of the methods in the embodiments may be included. The foregoing storage medium may be: a magnetic disk, an optical disc, a read-only memory (ROM), a random access memory (RAM), or the like.

What are disclosed above are merely examples of embodiments of the present disclosure, and certainly are not intended to limit the scope of the claims of the present disclosure. Therefore, equivalent variations made in accordance with the claims of the present disclosure shall fall within the scope of the present disclosure.

What is claimed is:

1. A method for using a radio interface technology, comprising:
   dividing, by a base station, a frequency band of a cell into N frequency ranges, wherein each of the N frequency ranges supports one radio interface technology, and the cell supports at least two radio interface technologies;
   sending, by the base station, radio resource configuration information of the N frequency ranges and random access resource information of the cell to a user equipment (UE), wherein the random access resource information is used to instruct the UE to access the cell or instruct the UE to perform uplink synchronization with the cell;
   mapping, by the base station, a data radio bearer (DRB) of the UE into at least one frequency range of the N frequency ranges, wherein each of the DRB is corresponding to one of the at least one frequency range, and each of the at least one frequency range is corresponding to at least one of the DRB;
   sending, by the base station, indication information to the UE, wherein the indication information is used to indicate a frequency range into which the DRB is to be mapped; and
   transmitting, by the base station by using a radio interface technology supported by the frequency range into which the DRB is mapped, a service carried on the DRB with the UE;
   wherein N is an integer, and N≥2.

2. The method according to claim 1, wherein before the mapping, by the base station, the DRB of the UE into at least one frequency range of the N frequency ranges, the method further comprises:
   mapping, by the base station, a signaling radio bearer (SRB) of the UE into at least one frequency range of the N frequency ranges, wherein each of the SRB is corresponding to one of the at least one frequency range, and each of the at least one frequency range is corresponding to at least one of the SRB;
   sending, by the base station, first indication information to the UE, wherein the first indication information is used to indicate, to the UE, a frequency range into which the SRB is to be mapped; and
   sending, by the base station, radio resource control (RRC) signaling to the UE by using a radio interface technology supported by the frequency range into which the SRB is mapped, wherein the RRC signaling is used to establish the DRB of the UE.

3. The method according to claim 1, wherein the frequency range comprises a common frequency range and a dedicated frequency range,
   wherein the common frequency range is a frequency range shared by radio interface technologies supported by the N frequency ranges, and comprises a radio resource required by a common channel, or a radio resource required by a common channel and a signaling radio bearer (SRB);
   wherein the dedicated frequency range is a frequency range used by the radio interface technology individually, and the dedicated frequency range carries a radio resource required by a DRB;
   wherein the common frequency range further comprises a radio resource required by a DRB; and
   wherein the dedicated frequency range further comprises a radio resource required by an SRB.

4. The method according to claim 3, wherein the common channel comprises a synchronization channel, a cell-specific reference signal, a broadcast channel, a paging channel, or a random access channel.

5. The method according to claim 1, wherein the frequency range comprises a dedicated frequency range,
   wherein the dedicated frequency range is a frequency range used by the radio interface technology individually, and comprises a common channel, a radio resource required by a signaling radio bearer (SRB), and a radio resource required by a DRB.

6. The method according to claim 1, wherein the radio resource configuration information comprises at least one of frequency band information, a correspondence between the N frequency ranges and the radio interface technologies, or characteristic information of the radio interface technology.

7. The method according to claim 6, wherein the sending, by the base station, radio resource configuration information of the N frequency ranges to the UE comprises: sending, by the base station, the frequency band information of the N frequency ranges to the UE by using a system broadcast message or radio resource control (RRC) control signaling, wherein the method further comprises:
   sending, by the base station, the system broadcast message or the RRC control signaling to the UE by using the common frequency range, wherein the system broadcast message or the RRC control signaling comprises frequency band information of the common frequency range and frequency band information of the dedicated frequency range; or
   sending, by the base station, the system broadcast message or the RRC control signaling to the UE by using the dedicated frequency range, wherein the system broadcast message or the RRC control signaling comprises frequency band information of the dedicated frequency range.

8. A method for using a radio interface technology, wherein a frequency band of a cell is divided into N frequency ranges, each of the N frequency ranges supports one radio interface technology, and the cell supports at least two radio interface technologies, the method comprising:
   receiving, by a user equipment (UE), radio resource configuration information of the N frequency ranges and random access resource information of the cell that are sent by the base station, wherein the random access resource information is used to instruct the UE to access the cell or instruct the UE to perform uplink synchronization with the cell;
   accessing, by the UE, a wireless network or performing uplink synchronization according to the random access resource information of the cell sent by the base station;
   receiving, by the UE, indication information sent by the base station, wherein the indication information is used to indicate a frequency range into which a data radio bearer (DRB) of the UE is to be mapped;
   mapping, by the UE, the DRB of the UE into the frequency range into which the DRB is to be mapped; and
   transmitting, by the UE by using a radio interface technology supported by the frequency range into which the DRB is mapped, a service carried on the DRB with the base station;
   wherein N is an integer, and N≥2.

9. The method according to claim 8, wherein the radio resource configuration information comprises at least one of frequency band information, a correspondence between the N frequency ranges and radio interface technologies, or characteristic information of the radio interface technology.

10. The method according to claim 9, wherein
   the N frequency ranges comprise a common frequency range and a dedicated frequency range, or comprise a dedicated frequency range; and
   the UE receives, from a system broadcast message or Radio Resource Control (RRC) signaling that is sent by the base station, the frequency band information sent by the base station.

11. The method according to claim 10, further comprising:
   receiving, by the UE, the system broadcast message or the RRC control signaling that is sent by the base station by using the common frequency range, wherein the system broadcast message or the RRC control signaling comprises frequency band information of the common frequency range and frequency band information of the dedicated frequency range; or
   receiving, by the UE, the system broadcast message or the RRC control signaling that is sent by the base station by using the dedicated frequency range, wherein the system broadcast message or the RRC control signaling comprises frequency band information of the dedicated frequency range; and
   wherein the method further comprises:
      learning, by the UE, the correspondence between the N frequency ranges and the radio interface technologies or the characteristic information of the radio interface technology by using the system broadcast message sent by the base station; or
      learning, by the UE, the correspondence between the N frequency ranges and the radio interface technologies or the characteristic information of the radio interface technology by using the RRC signaling sent by the base station.

12. The method according to claim 8, wherein the mapping, by the UE, the DRB of the UE into the frequency range into which the DRB is to be mapped comprises:
   learning, by the UE by using the indication information sent by the base station, the radio interface technology supported by the frequency range into which the DRB is to be mapped; and
   mapping, by the UE, the DRB into the radio interface technology supported by the frequency range into which the DRB is to be mapped.

13. A base station device, comprising:
   a processor, configured to divide a frequency band of a cell into N frequency ranges, wherein each of the N frequency ranges supports one radio interface technology, and the cell supports at least two radio interface technologies; and
   a transceiver, configured to send radio resource configuration information of the N frequency ranges and random access resource information of the cell to a user equipment (UE), wherein the random access resource information is used to instruct the UE to access the cell or instruct the UE to perform uplink synchronization with the cell;
   wherein the processor is further configured to map a data radio bearer (DRB) of the UE into at least one frequency range of the N frequency ranges, wherein each of the DRB is corresponding to one of the at least one frequency range, and each of the at least one frequency range is corresponding to at least one of the DRB; and
   wherein the transceiver is further configured to transmit, by using a radio interface technology supported by the frequency range into which the DRB is mapped, a service carried on the DRB with the UE;
   wherein N is an integer, and N≥2.

14. The base station device according to claim 13, wherein:
   the processor is further configured to map a signaling radio bearer (SRB) of the UE into at least one frequency range of the N frequency ranges, wherein each of the SRB is corresponding to one of the at least one frequency range, and each of the at least one frequency range is corresponding to at least one of the SRB;
   the transceiver is further configured to send first indication information to the UE, wherein the first indication information is used to indicate, to the UE, a frequency range into which the SRB is to be mapped; and the transceiver is further configured to send radio resource control (RRC) signaling to the UE by using a radio interface technology supported by the frequency range into which the SRB is mapped, wherein the RRC signaling is used to establish the DRB of the UE.

15. The base station device according to claim 13,
wherein the frequency range comprises a common frequency range and a dedicated frequency range,
wherein the common frequency range is a frequency range shared by radio interface technologies supported by the N frequency ranges, and comprises a radio resource required by a common channel, or a radio resource required by a common channel and a signaling radio bearer SRB;
wherein the dedicated frequency range is a frequency range used by the radio interface technology individually, and the dedicated frequency range carries a radio resource required by a DRB
wherein the common frequency range further comprises a radio resource required by a DRB; and
wherein the dedicated frequency range further comprises a radio resource required by an SRB.

16. The base station device according to claim 15, wherein the common channel comprises a synchronization channel, a cell-specific reference signal, a broadcast channel, a paging channel, or a random access channel.

17. The base station device according to claim 13,
wherein the frequency range comprises a dedicated frequency range,
wherein the dedicated frequency range is a frequency range used by the radio interface technology individually, and comprises a common channel, a radio resource required by an SRB, and a radio resource required by a DRB.

18. The base station device according to claim 13, wherein the radio resource configuration information comprises at least one of frequency band information, a correspondence between the N frequency ranges and the radio interface technologies, or characteristic information of the radio interface technology.

19. The base station device according to claim 18,
wherein the transceiver is configured to:
send the frequency band information of the N frequency ranges to the UE by using a system broadcast message or radio resource control (RRC) control signaling; and
wherein the transceiver is configured to:
send the system broadcast message or the RRC control signaling to the UE by using the common frequency range, wherein the system broadcast message or the RRC control signaling comprises frequency band information of the common frequency range and frequency band information of the dedicated frequency range; or
send the system broadcast message or the RRC control signaling to the UE by using the dedicated frequency range, wherein the system broadcast message or the RRC control signaling comprises frequency band information of the dedicated frequency range.

20. A terminal device configured to support a method for using a radio interface technology, wherein a frequency band of a cell is divided into N frequency ranges, each of the N frequency ranges supports one radio interface technology, and the cell supports at least two radio interface technologies, wherein the terminal device comprises:
a transceiver, configured to receive radio resource configuration information of the N frequency ranges and random access resource information of the cell that are sent by the base station, wherein the random access resource information is used to instruct the terminal device to access the cell or instruct the terminal device to perform uplink synchronization with the cell; and
a processor, configured to access a wireless network or perform uplink synchronization according to the random access resource information of the cell sent by the base station;
wherein the transceiver is further configured to receive indication information sent by the base station, wherein the indication information is used to indicate a frequency range into which a data radio bearer (DRB) of the terminal device is to be mapped;
wherein the processor is further configured to map the DRB of the terminal device into the frequency range into which the DRB is to be mapped;
wherein the transceiver is further configured to transmit, by using a radio interface technology supported by the frequency range into which the DRB is mapped, a service carried on the DRB with the base station; and
wherein N is an integer, and N≥2.

21. The terminal device according to claim 20, wherein the radio resource configuration information comprises at least one of frequency band information, a correspondence between the N frequency ranges and radio interface technologies, or characteristic information of the radio interface technology.

22. The terminal device according to claim 21, wherein the N frequency ranges comprise a common frequency range and a dedicated frequency range, or comprise a dedicated frequency range; and
the transceiver is configured to receive, from a system broadcast message or Radio Resource Control (RRC) signaling that is sent by the base station, the frequency band information sent by the base station.

23. The terminal device according to claim 22, wherein the transceiver is configured to:
receive the system broadcast message or the RRC control signaling that is sent by the base station by using the common frequency range, wherein the system broadcast message or the RRC control signaling comprises frequency band information of the common frequency range and frequency band information of the dedicated frequency range; or
receive the system broadcast message or the RRC control signaling that is sent by the base station by using the dedicated frequency range, wherein the system broadcast message or the RRC control signaling comprises frequency band information of the dedicated frequency range; and
wherein:
the transceiver is further configured to receive the correspondence between the N frequency ranges and the radio interface technologies or the characteristic information of the radio interface technology by using the system broadcast message sent by the base station; or
the transceiver is further configured to receive the correspondence between the N frequency ranges and the radio interface technologies or the characteristic information of the radio interface technology by using the RRC signaling sent by the base station.

24. The terminal device according to claim 20, wherein:
the transceiver is further configured to receive first indication information sent by the base station, wherein the first indication information is used to indicate a frequency range into which a signaling radio bearer (SRB) of the terminal device is to be mapped;

the processor is further configured to map the SRB of the terminal device into the frequency range into which the SRB is to be mapped; and the transceiver is further configured to transmit radio resource control (RRC) signaling with the base station by using a radio interface technology supported by the frequency range into which the SRB is mapped, wherein the RRC signaling is used to establish the DRB of the terminal device.

25. The terminal device according to claim 20, wherein the processor is configured to:

learn, by using the indication information that is sent by the base station and that is received by the transceiver, the radio interface technology supported by the frequency range into which the DRB is to be mapped, and map the DRB into the radio interface technology supported by the frequency range into which the DRB is to be mapped.

* * * * *